(12) United States Patent
Kato et al.

(10) Patent No.: US 10,919,382 B2
(45) Date of Patent: Feb. 16, 2021

(54) ROTARY TYPE EXTENSION/RETRACTION DEVICE

(71) Applicant: PIOLAX, INC., Yokohama (JP)

(72) Inventors: Tsutomu Kato, Yokohama (JP);
Noboru Niikura, Yokohama (JP)

(73) Assignee: PIOLAX, INC., Yokohama (JP)

( * ) Notice: Subject to any disclaimer, the term of this patent is extended or adjusted under 35 U.S.C. 154(b) by 177 days.

(21) Appl. No.: 16/326,667

(22) PCT Filed: Aug. 21, 2017

(86) PCT No.: PCT/JP2017/029725
§ 371 (c)(1),
(2) Date: Feb. 19, 2019

(87) PCT Pub. No.: WO2018/038034
PCT Pub. Date: Mar. 1, 2018

(65) Prior Publication Data
US 2019/0184819 A1    Jun. 20, 2019

(30) Foreign Application Priority Data

Aug. 26, 2016  (JP) .................................. 2016-166264
Mar. 13, 2017  (JP) .................................. 2017-047727

(51) Int. Cl.
*B60K 15/05*    (2006.01)
*E05B 83/34*    (2014.01)
*E05C 19/02*    (2006.01)

(52) U.S. Cl.
CPC .............. *B60K 15/05* (2013.01); *E05B 83/34* (2013.01); *E05C 19/02* (2013.01); *B60K 2015/0561* (2013.01)

(58) Field of Classification Search
CPC . B60K 15/05; B60K 2015/0561; E05B 83/34; E05C 19/02

(Continued)

(56) References Cited

U.S. PATENT DOCUMENTS

2014/0042768 A1* 2/2014 Watanabe .............. B60K 15/05
                                                      296/97.22
2014/0291996 A1  10/2014 Basavarajappa et al.
(Continued)

FOREIGN PATENT DOCUMENTS

DE  10 2011 116 067 A1    1/2013
JP       S 57-73977 U     5/1982
WO  WO 2015/162861 A1    10/2015

OTHER PUBLICATIONS

International Search Report (ISR) (PCT Form PCT/ISA/210), in PCT/JP2017/029725, dated Sep. 19, 2017, with English Translation.
(Continued)

*Primary Examiner* — Pinel E Romain
(74) *Attorney, Agent, or Firm* — McGinn IP Law Group, PLLC

(57) ABSTRACT

A rotary type extension/retraction device includes a body member, a movement member, a spring member, a protrusion and a cam groove. The cam groove has a first fitting groove configured to hold the movement member in a state protruding from a cylindrical part of the body member, a second fitting groove configured to hold the movement member in a state pulled in the cylindrical part, a first guide groove configured to guide the protrusion from the first fitting groove to the second fitting groove, and a second guide groove configured to guide the protrusion from the second fitting groove to the first fitting groove. The first fitting groove, the first guide groove, the second fitting groove and the second guide groove are arranged circumferentially along an inner periphery of the cylindrical part in this order.

8 Claims, 21 Drawing Sheets

(58) Field of Classification Search
USPC .................................................... 296/97.22
See application file for complete search history.

(56) References Cited

U.S. PATENT DOCUMENTS

| | | | |
|---|---|---|---|
| 2014/0319846 A1 | 10/2014 | Basavarajappa et al. | |
| 2015/0048644 A1* | 2/2015 | Georgi | H03K 17/97 |
| | | | 296/97.22 |
| 2015/0061314 A1* | 3/2015 | Beck | E05B 81/66 |
| | | | 296/97.22 |
| 2015/0114052 A1* | 4/2015 | Kitamura | E05B 85/02 |
| | | | 70/158 |
| 2015/0224872 A1* | 8/2015 | Frommann | B60K 15/05 |
| | | | 296/97.22 |
| 2015/0291024 A1* | 10/2015 | Betzen | B60K 15/05 |
| | | | 296/97.22 |
| 2016/0375762 A1* | 12/2016 | Lee | B60K 15/05 |
| | | | 296/97.22 |
| 2017/0043660 A1 | 2/2017 | Horikawa et al. | |
| 2018/0313123 A1* | 11/2018 | Kenyon | E05D 3/02 |

OTHER PUBLICATIONS

Written Opinion of the International Searching Authority (PCT Form PCT/ISA/237), in PCT/JP2017/029725, dated Sep. 19, 2017.

\* cited by examiner

ROTARY TYPE EXTENSION/RETRACTION DEVICE

TECHNICAL FIELD

The present invention relates to a rotary type extension/retraction device that is to be used for an opening and closing structure of a fuel lid of an automobile, for example, and is configured to extend and retract while rotating by two-step press-fitting (push-push).

BACKGROUND ART

For example, a fuel lid of an automobile is arranged with a rod for receiving and supporting the lid in a state where an opening is closed with the lid. Also, the rod has a so-called push-push structure where it is extended and retracted by a press-fitting operation of the lid, in many cases.

Patent Document 1 discloses, as a device adopting the push-push structure, a lock structure of a lid including a body having a cylindrical part, a rod arranged to be extendible and retractable in the cylindrical part, and a spring for urging the rod in a direction protruding from a leading end opening of the cylindrical part. An outer periphery of the rod is formed with a heart cam groove in a circumferential direction, and a projection configured to enter the heart cam groove protrudes from an inner periphery of the cylindrical part.

When the projection of the cylindrical part is located at an apex portion of a part, which protrudes in a mountain shape, of the heart cam groove, the rod is held in a state extending from the leading end of the cylindrical part by a predetermined length. When the rod is pushed from the state, the projection slides along the heart cam groove, so that the rod is rotated. Then, when the projection is located at a portion, which is concave in a valley shape, of the heart cam groove, the rod is held in a retracted state. FIG. 15 (which is similar to FIG. 10 of Patent Document 1) illustrates a locus of the projection sliding along the heart cam groove.

PRIOR ART DOCUMENT

Patent Document
Patent Document 1: Germany Patent Application Publication No. 102011116067 (DE 10 2011 116 067 A1)

SUMMARY OF INVENTION

Problems to be Solved by Invention

According to the lock structure of Patent Document 1, the projection of the inner periphery of the cylindrical part is configured to enter the concave portion of the heart cam groove formed on the outer periphery of the rod. For this reason, as shown in FIG. 15, when pushing-in the rod from an extended state to a retracted state, it is necessary to push-in and rotate the rod beyond a position at which the rod is retracted, i.e., to over-stroke the rod in a rotating direction. Therefore, a sliding resistance of the projection sliding along the heart cam groove increases.

It is therefore an object of the present invention to provide a rotary type extension/retraction device capable of reducing a sliding resistance of a protrusion sliding along a cam groove when a movement member extends and retracts relative to a cylindrical part.

Means for Solving Problems

In order to achieve the above object, the present invention includes a body member having a cylindrical part of which an inner periphery has a circular shape, a movement member having a circular outer periphery, arranged in the cylindrical part of the body member and held to be axially slidable and rotatable relative to the cylindrical part, a spring member for urging the movement member in a direction protruding from one end of the cylindrical part, a protrusion formed on the outer periphery of the movement member, and a cam groove formed on the inner periphery of the cylindrical part and configured to fit therein the protrusion, wherein the cam groove has a first fitting groove configured to fit therein the protrusion and to hold the movement member in a state protruding from the cylindrical part, a second fitting groove configured to fit therein the protrusion and to hold the movement member in a state pulled in the cylindrical part, a first guide groove configured to, when the movement member is pressed against an urging force of the spring member in a state where the protrusion is fitted in the first fitting groove, guide the protrusion from the first fitting groove to the second fitting groove, and inclined in one direction of the inner periphery of the cylindrical part, and a second guide groove configured to, when the movement member is pressed against the urging force of the spring member in a state where the protrusion is fitted in the second fitting groove, guide the protrusion from the second fitting groove to the first fitting groove, and inclined in one direction of the inner periphery of the cylindrical part, and wherein the first fitting groove, the first guide groove, the second fitting groove and the second guide groove are arranged circumferentially along the inner periphery of the cylindrical part in this order.

Advantageous Effects of Invention

According to the present invention, when the movement member is pressed against the urging force of the spring member from the state where the protrusion is fitted in the first fitting groove and the movement member protrudes, the protrusion is guided to the first guide groove and the movement member is pulled-in while rotating, and when the protrusion is then fitted in the second fitting groove, the movement member is held in the pulled-in state. When the movement member is again pressed against the urging force of the spring member from the pulled-in state, the protrusion is guided to the second guide groove and the movement member protrudes while rotating, and when the protrusion is then fitted in the first fitting groove, the movement member is held in the protruding state. In this way, when the movement member is pushed, the protrusion is repetitively moved in order of the first fitting groove, the first guide groove, the second fitting groove and the second guide groove, so that the movement member can be alternately held in the protruding state or in the pulled-in state. Also, since the protrusion is moved along the first guide groove and the second guide groove arranged circumferentially along the inner periphery of the cylindrical part, it is not necessary to over-stroke the movement member in a rotating direction and to guide the same to the fitting groove, like the heart cam, so that it is possible to reduce a sliding resistance of the protrusion.

BRIEF DESCRIPTION OF DRAWINGS

FIGS. 6A to 6D illustrate an operating state of the movement member relative to the cylindrical part in the rotary type extension/retraction device, in which FIG. 6A is an enlarged perspective view of main parts in a protruding state of the movement member from the cylindrical part, FIG. 6B is an enlarged perspective view of main parts in a pulled-in state of the movement member from the cylindrical part, FIG. 6C is an enlarged perspective view of main parts in the pulled-in state of the movement member from the cylindrical part, as seen from an angle different from FIG. 6B, and FIG. 6D is an enlarged perspective view of main parts in the protruding state of the movement member from the cylindrical part, as seen from an angle different from FIG. 6A.

FIGS. 8A and 8B illustrate a relation between the protrusion and a cam groove in the rotary type extension/retraction device, in which FIG. 8A is an enlarged view of main parts and FIG. 8B is a development view.

FIGS. 17A and 17B illustrate a movement member configuring the rotary type extension/retraction device, in which FIG. 17A is an enlarged perspective view and FIG. 17B is a perspective view illustrating a state where a separate protrusion is mounted to the movement member.

FIGS. 18A to 18C illustrate a mounting process of the movement member and the protrusion to a first body part in the rotary type extension/retraction device, in which FIG. 18A is a perspective view of a first process, FIG. 18B is a perspective view of a second process, and FIG. 18C is a perspective view of a third process.

EMBODIMENTS OF INVENTION

Hereinafter, embodiments of the rotary type extension/retraction device of the present invention will be described with reference to the drawings. FIGS. 1 to 14 illustrate a first embodiment of the rotary type extension/retraction device of the present invention.

Figure 1:
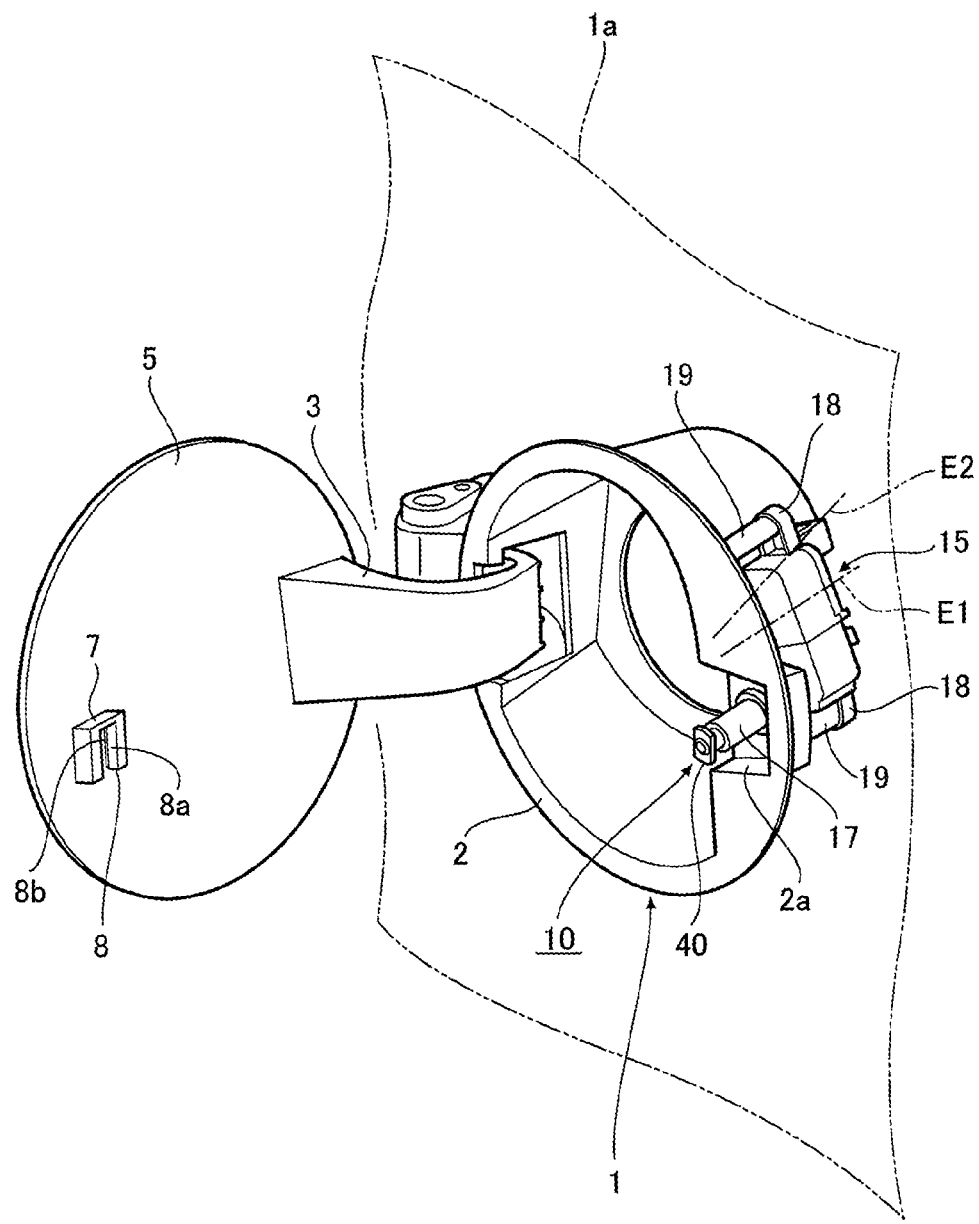
FIG. 1 is a perspective view of an embodiment of a rotary type extension/retraction device of the present invention.

For example, as shown in FIG. 1, the rotary type extension/retraction device is used for an opening and closing structure of a fuel lid. As shown in FIG. 1, a fixed member 1 having a substantially cylindrical box shape is fixed to a peripheral edge of a fuel filler tube opening of a vehicle body 1a, and an opening and closing member (fuel lid) 5 is mounted to be openable and closable to the fixed member 1 via a hinge part 3. Also, an annular flange 2 protrudes from an opening-side peripheral edge of the fixed member 1. Also, a concave part 2a is provided at a side of the fixed member 1 circumferentially opposite to the hinge part 3, and a rotary type extension/retraction device 10 of the first embodiment (hereinafter, referred to as "extension/retraction device 10") is arranged in the concave part 2a. Also, an inner surface of the opening and closing member 5 is provided with an engagement part 7 having a door frame shape of which a bottom side and one side part are opened, and an inner side of the engagement part is formed with an engaging groove 8. The engaging groove 8 has a pair of inner walls arranged in parallel with each other and has a shape in which a width of an inner side 8b of the groove is greater than a width of an opening 8a of the pair of inner walls.

The extension/retraction device 10 of the first embodiment is used for the opening and closing structure of the fuel lid as described above. However, for example, the extension/retraction device can be used for an opening and closing structure of a glove box of an automobile, for a furniture, a daily commodity and the like having a structure to be opened and closed by pushing, and the like. Also, a using aspect, an equipment place and the like thereof are not particularly limited.

Figure 2:
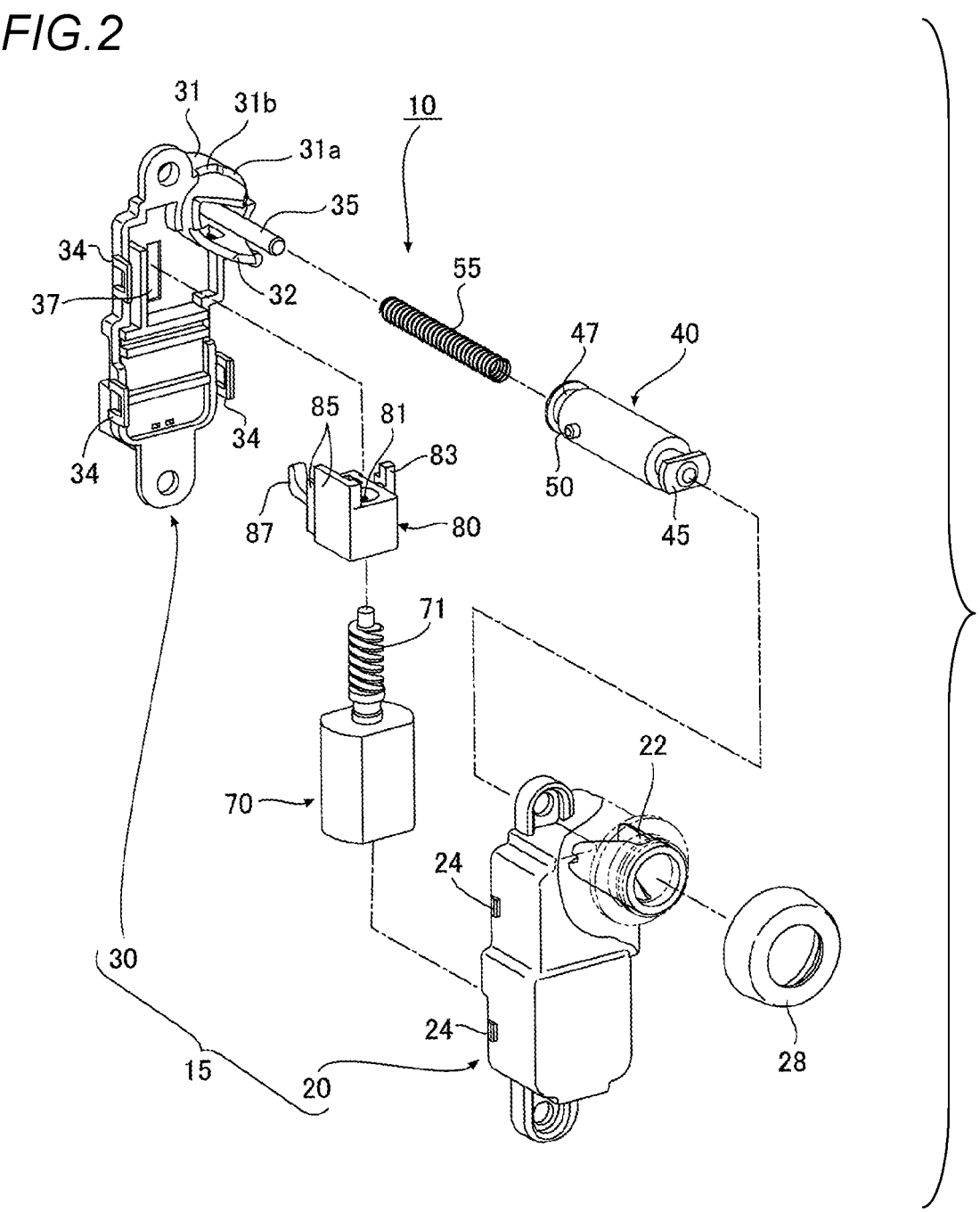
FIG. 2 is an exploded perspective view of the rotary type extension/retraction device.
Figure 4:
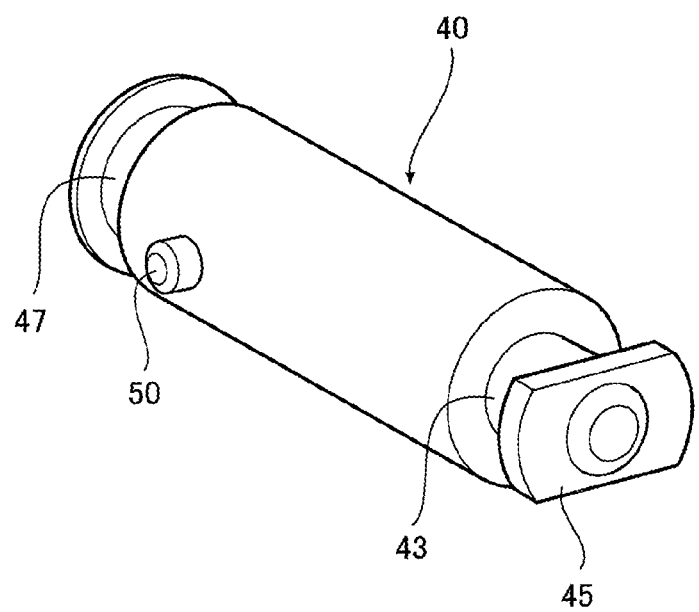
FIG. 4 is an enlarged perspective view of a movement member configuring the rotary type extension/retraction device.
Figure 5:
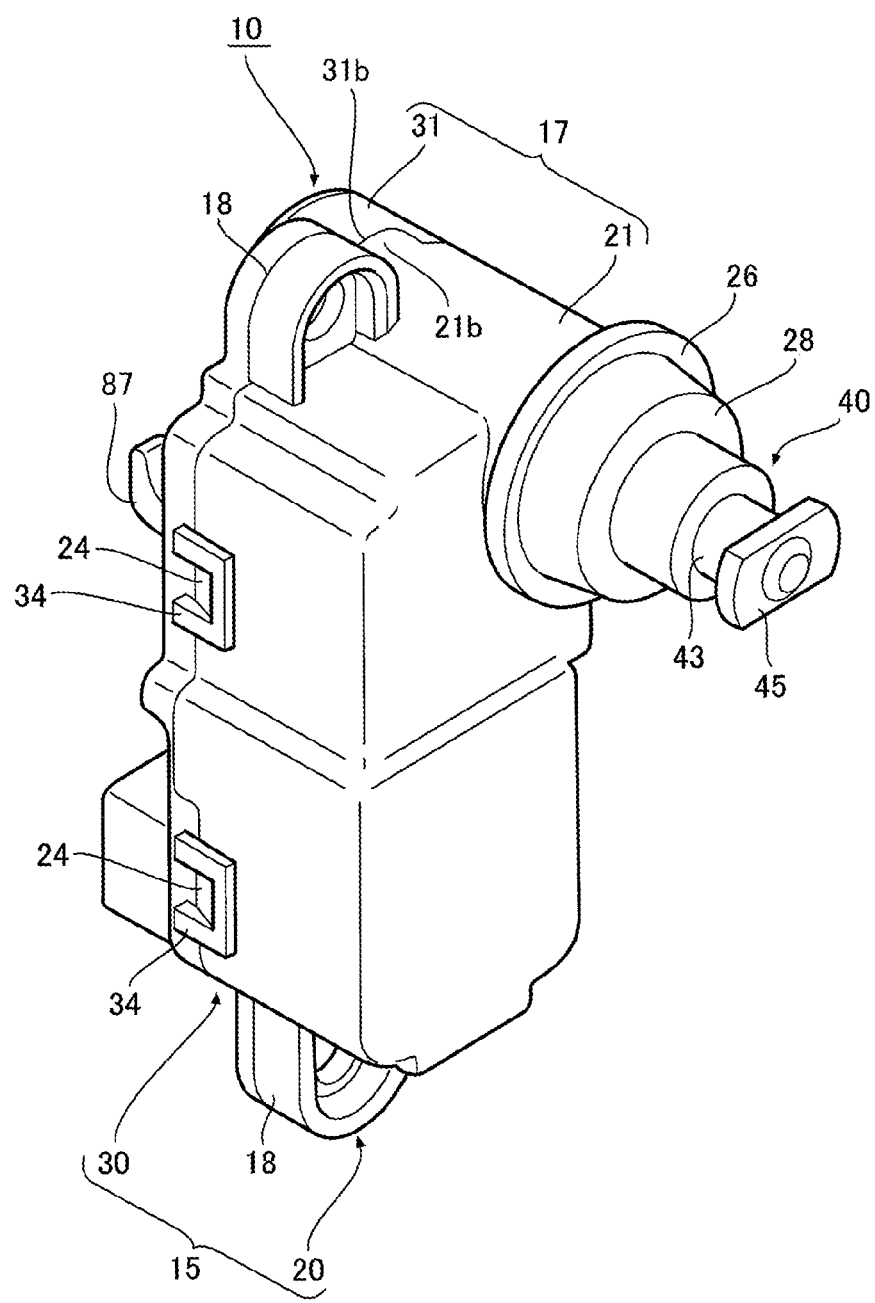
FIG. 5 is an enlarged perspective view of the rotary type extension/retraction device.

As shown in FIG. 2, FIG. 4 and FIG. 5, the extension/retraction device 10 of the first embodiment includes a body member 15 having a cylindrical part 17 of which an inner periphery has a circular shape, a movement member 40 having a circular outer periphery, arranged in the cylindrical part 17 of the body member 15 and held to be axially slidable and rotatable relative to the cylindrical part 17, a spring member 55 for urging the movement member 40 in a direction protruding from one end of the cylindrical part 17, protrusions 50 formed on the outer periphery of the movement member 40, and a cam groove 60 (refer to FIGS. 6A to 6D) formed on the inner periphery of the cylindrical part 17 and configured to fit therein the protrusions 50.

Figure 3:
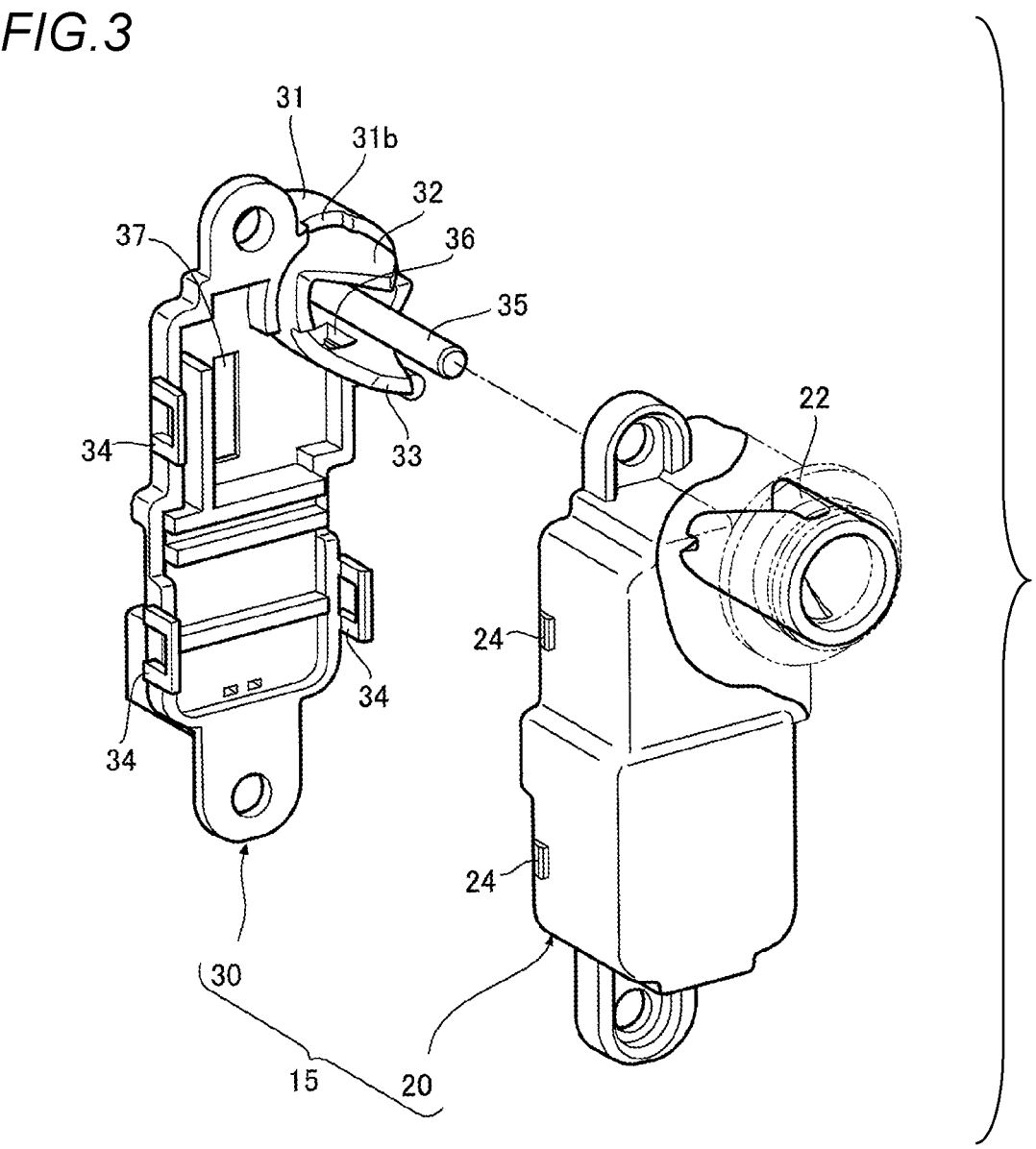
FIG. 3 is an enlarged exploded perspective view when a part of a body member configuring the rotary type extension/retraction device is projected.

As shown in FIG. 2 and FIG. 3, the body member 15 has a first body part 20 and a second body part 30 mounted to each other so as to axially divide the cylindrical part 17. Also, as shown in FIG. 5, the body member 15 is provided with a pair of mounting parts 18, 18. The extension/retraction device 10 is mounted to the fixed member 1 by mounting bolts 19, 19 via the pair of mounting parts 18, 18 (refer to FIG. 1).

Figure 7:
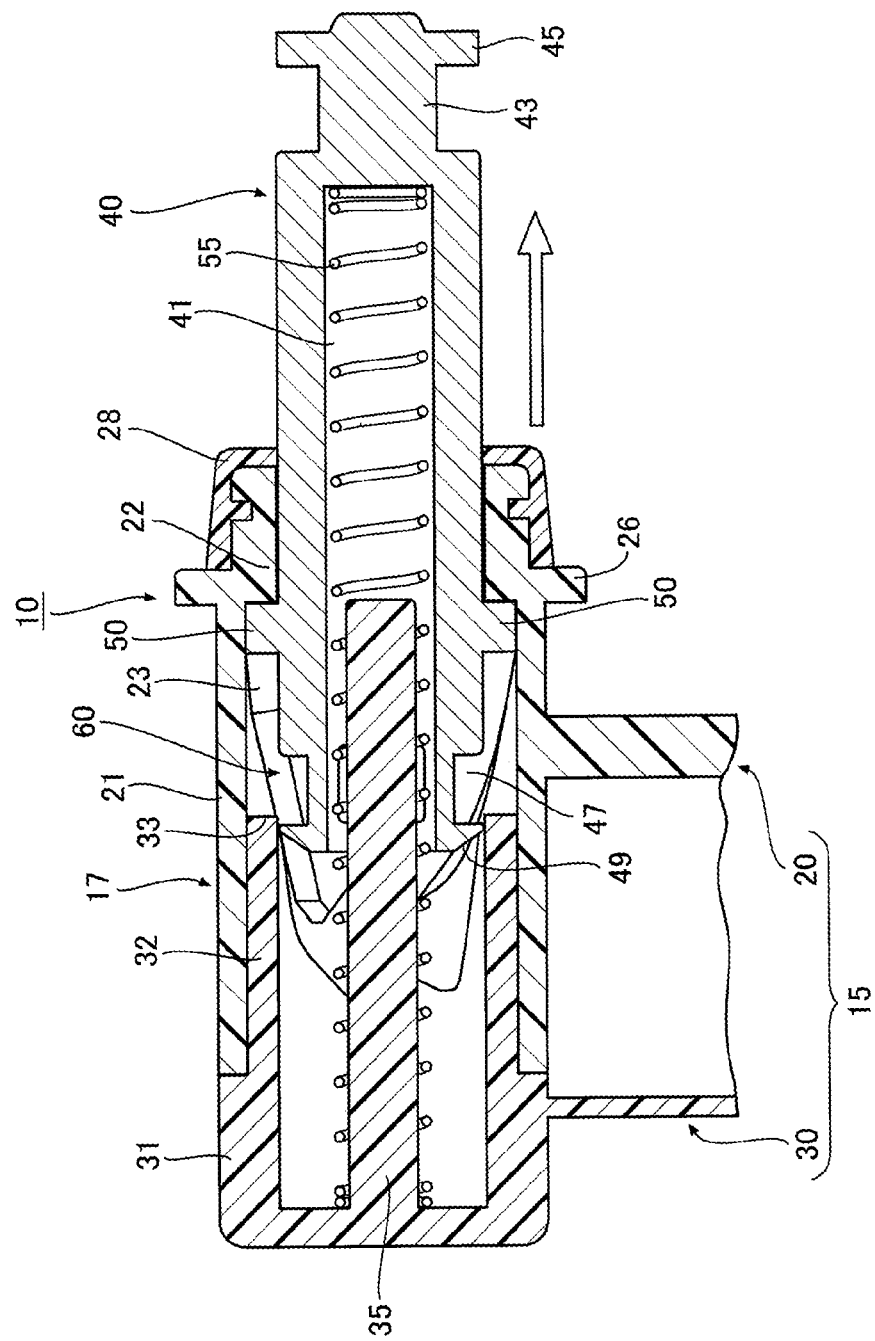
FIG. 7 is an enlarged sectional view of main parts of the rotary type extension/retraction device.
Figure 9:
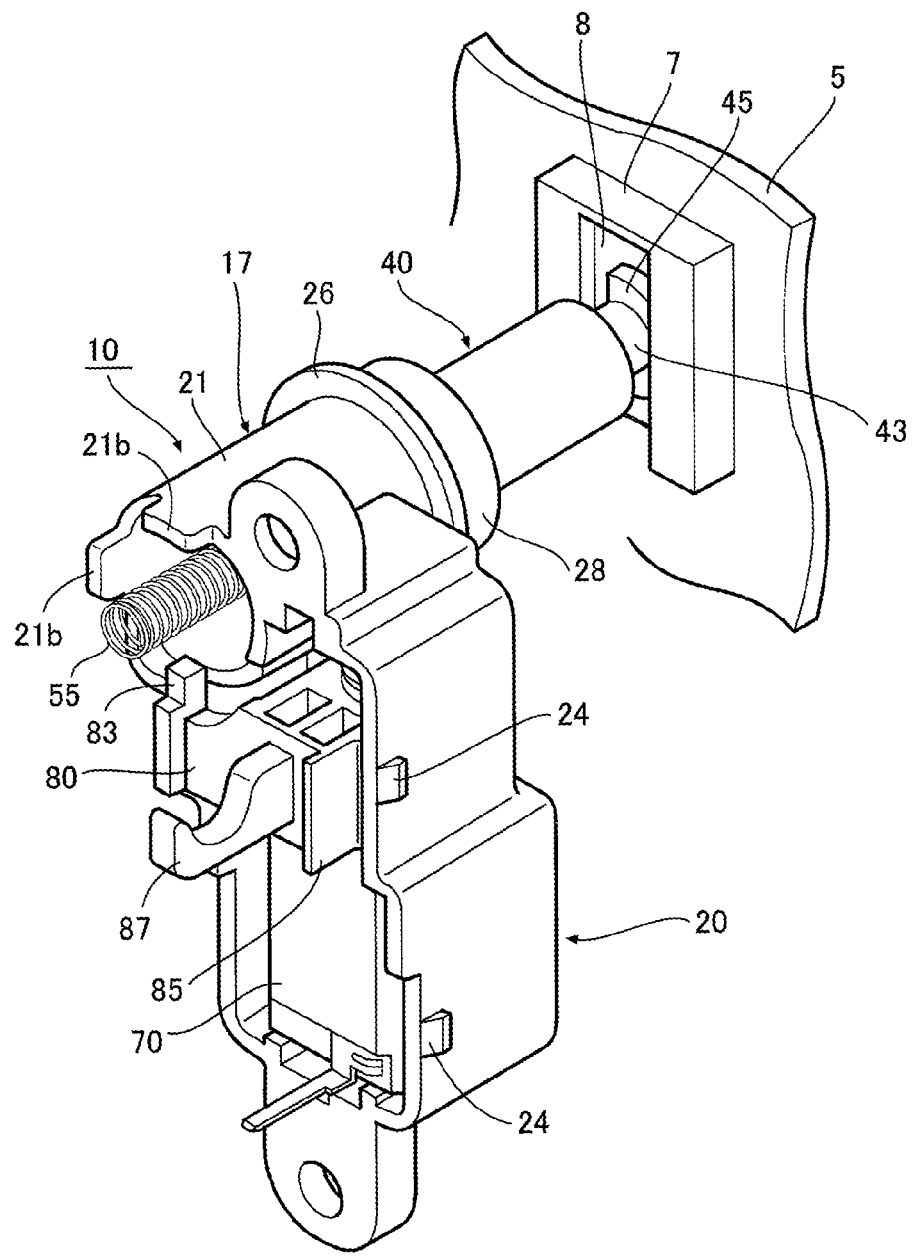
FIG. 9 is an enlarged perspective view illustrating a state where an engaging piece of the movement member is not engaged with an engaging groove of an opening and closing member in the rotary type extension/retraction device.

As shown in FIG. 9, the first body part 20 has a substantially long box shape extending in one direction, and one end-side thereof in a longitudinal direction is formed with a first cylinder part 21 having a substantially cylindrical shape and forming the cylindrical part 17. In the first cylinder part 21, a step-shaped protruding portion 32 (which will be described later) of the second body part 30 is inserted (refer to FIG. 7). As shown in FIG. 5 and FIG. 9, a plurality of convex portions 21b protrudes from an end face, which is located at a division surface-side of the cylindrical part 17 (hereinafter, referred to as "cylindrical part division surface"), of the first cylinder part 21. Also, as shown in FIG. 3 and FIG. 7, an inner peripheral surface of the first cylinder part 21 is provided with a step-shaped protruding portion 22 for forming a cam groove 60 between the step-shaped protruding portion and the step-shaped protruding portion 32 of the second body part 30.

Also, a plurality of engaging protrusions 24 protrudes from an opening peripheral edge of the first body part 20. Also, an end portion outer periphery of the first cylinder part 21 opposite to the cylindrical part division surface is formed with an annular flange part 26 (refer to FIG. 5), and a seal member 28 made of rubber, elastic elastomer or the like and having an insertion hole formed at a center thereof is mounted to the end portion outer periphery (refer to FIG. 2), so that one end-side opening of the cylindrical part 17 in a protruding direction of the movement member 40 is covered to seal a gap between the inner periphery of the cylindrical part 17 and the outer periphery of the movement member 40 for preventing water and the like from being introduced into the gap.

Also, as shown in FIG. 9, a drive device 70 is arranged at the other end-side of the first body part 20 in the longitudinal direction, and an engagement member 80 is arranged between the first body part 20 of the first cylinder part 21 and the arrangement part of the drive device 70. As shown in FIG. 2, the drive device 70 has a worm gear 71, and the worm gear 71 is configured to rotate in a predetermined direction by a power feeding means (not shown). Also, as shown in FIG. 2, the engagement member 80 has a female screw 81 formed at a central portion and configured to mesh with the worm gear 71, and is configured to slide toward and away from the movement member 40 by rotation of the worm gear 71. In the meantime, the sliding operation of the engagement member 80 by the drive device 70 may be performed by a ball screw, an electromagnetic solenoid or the like as well as by the worm gear, and is not particularly limited.

Figure 10:
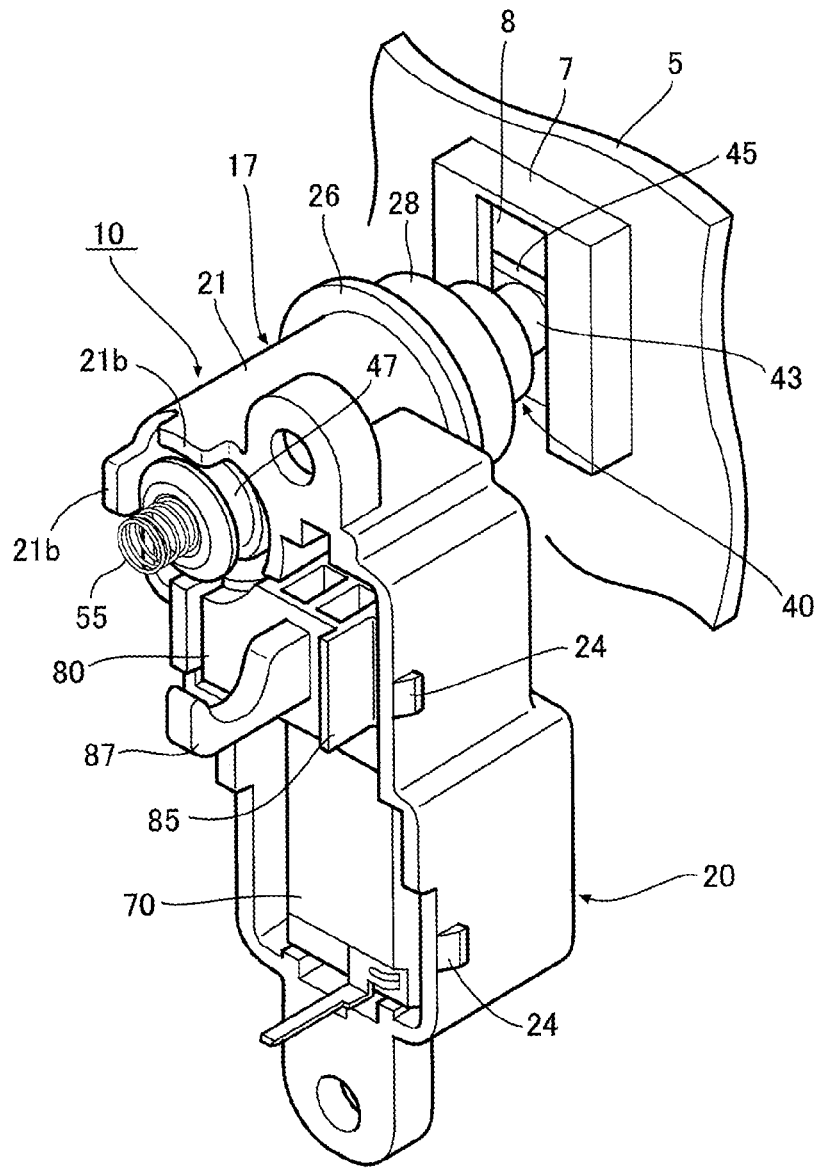
FIG. 10 is an enlarged perspective view illustrating a state where the engaging piece of the movement member is engaged with the engaging groove of the opening and closing member in the rotary type extension/retraction device.

Also, referring to FIGS. 9 and 10, an engaging protrusion 83 to be engaged and disengaged to and from a lock groove 47 (which will be described later) of the movement member 40 protrudes from an upper end of one side part of the engagement member 80, a guide piece 85 is formed at the other side part, and a hook-shaped operation knob 87 extends from a backside. In the meantime, the operation knob 87 is provided to manually slide the engagement member 80 and to thereby disengage the engaging protrusion 83 from the lock groove 47 of the movement member 40 when the worm gear 71 is not rotated due to a failure of the drive device 70 and the like and the engagement member 80 cannot be thus slid.

In the meantime, the second body part 30 has a substantially long plate shape extending in one direction, in correspondence to the first body part 20, and is provided at one end-side in the longitudinal direction with a second cylinder part 31 having a bottomed cylindrical shape and configured to form the cylindrical part 17 together with the first cylinder part 21. In the meantime, an outer diameter of the second cylinder part 31 is the same as an outer diameter of the first cylinder part 21, so that the outer peripheral surface of the cylindrical part 17 has no step (refer to FIG. 7).

Also, an end face, which is located at a cylindrical part division surface-side, of the second cylinder part 31 is formed with a plurality of concave portions 31b in which the convex portions 21b of the first cylinder part 21 are to be fitted (refer to FIG. 3 and FIG. 5). Also, as shown in FIG. 3 and FIG. 7, a step-shaped protruding portion 32 having a cylinder shape of a diameter smaller than the second cylinder part 31 and to be inserted in the first cylinder part 21 protrudes from the cylindrical part division surface of the second cylinder part 31. As shown in FIG. 7, an inner diameter of the step-shaped protruding portion 32 is the same as an inner diameter of the second cylinder part 31 and an inner diameter of the step-shaped protruding portion 22 of the first cylinder part 21, and an outer diameter of the step-shaped protruding portion 32 is adapted to an inner diameter of the first cylinder part 21.

When mounting the first body part 20 and the second body part 30 each other, the step-shaped protruding portion 32 of the second cylinder part 31 is inserted in the first cylinder part 31 and is thus arranged with being in contact with the inner peripheral surface of the first cylinder part, and an end face 33 of the step-shaped protruding portion 32 and an end face 23 of the step-shaped protruding portion 22 of the first cylinder part 21 are arranged to face each other, so that the cam groove 60 is formed therebetween, as shown in FIG. 7.

Also, as shown in FIG. 3, a peripheral edge of the second body part 30 is provided with a plurality of engaging frame portions 34 having a frame shape, and the plurality of engaging protrusions 24 of the first body part 20 is respectively engaged thereto, so that the first body part 20 and the second body part 30 are mounted to each other to configure the body member 15 (refer to FIG. 5).

Also, as shown in FIG. 7, a spring support column 35 having a circular cylinder shape protrudes from a center of an inner surface of a bottom of the second cylinder part 31, and is configured to support a spring member 55 so that the spring member is difficult to be tilted. In the meantime, as shown in FIG. 2, the drive device 70 is arranged at the other end-side of the second body part 30 in the longitudinal direction, and the engagement member 80 is arranged between the second cylinder part 31 of the second body part 30 and the arrangement place of the drive device 70. Also, as shown in FIG. 3, a side, at which the engagement member is arranged, of a circumferential wall of the second cylinder part 31 is formed with a slide hole 36 for slidably holding the engaging protrusion 83 of the engagement member 80. Also, the arrangement place, at which the engagement member is arranged, of the second body part 30 is formed with a slide hole 37 for slidably holding the operation knob 87 of the engagement member 80.

Subsequently, the movement member 40 that is arranged in the cylindrical part 17 and is held to be axially slidable and rotatable relative to the cylindrical part 17 is described. As shown in FIG. 4 and FIG. 7, the movement member 40 of the first embodiment has a substantially cylindrical shape where a base end-side opposite to the protruding direction from one end of the cylindrical part 17 of the body member 15 is concave, and a spring accommodation space 41 in which the spring member 55 is arranged is provided therein. As shown in FIG. 7, one end portion of the spring member 55 is supported to the inner surface of the bottom of the second cylinder part 31 and the other end portion is inserted in the spring accommodation space 41 and is supported to an inner end face thereof, so that the spring member urges the movement member 40 in the protruding direction from one end of the cylindrical part 17 (refer to an arrow in FIG. 7). In this way, the movement member 40 is urged by the spring member 55 but the protrusion 50 is fitted in the first fitting groove 61 or the second fitting groove 63 of the cam groove 60, so that the body member 15 is prevented from disengaging from the cylindrical part 17.

Also, a column part 43 having a small outer diameter protrudes from a center of a leading end of the movement member 40 in the protruding direction from one end of the cylindrical part 17, and a leading end of the column part 43 is provided with a band-shaped engaging piece 45 of which both ends in a longitudinal direction have a circular arc. As shown in FIGS. 6A to 6D, the engaging piece 45 is configured so that an angle thereof is changed in association with rotation of the movement member 40, and is thus engaged and disengaged to and from the engaging groove 8 of the opening and closing member 5. In the first embodiment, the longitudinal direction of the engaging piece 45 is arranged to follow a groove direction of the engaging groove 8 of the engagement part 7 provided to the opening and closing member 5 when the opening and closing member 5 is opened from the opening of the fixed member 1 (refer to FIG. 1 and FIG. 9). On the other hand, the angle of the longitudinal direction of the engaging piece 45 is changed to be perpendicular to the groove direction of the engaging groove 8 when the opening and closing member 5 is closed relative to the opening of the fixed member 1 (refer to FIG. 10).

Also, an outer periphery of a base end-side of the movement member 40, which is opposite to the protruding direction from one end of the cylindrical part 17, is formed with an annular lock groove 47 over an entire circumference thereof. The engaging protrusion 83 of the engagement member 80 is to be engaged and disengaged to and from the lock groove 47 (refer to FIG. 11). Also, as described later, when the protrusion 50 is fitted in the second fitting groove 63 of the cam groove 60 and the movement member 40 is thus in a pulled-in state from one end in the protruding direction of the cylindrical part 17, the engaging protrusion 83 of the engagement member 80 is engaged with the lock groove 47 (refer to FIG. 11). In the state where the engaging protrusion 83 of the engagement member 80 is engaged with the lock groove 47, the movement member 40 cannot be further pushed with the protrusion 50 being fitted in the second fitting groove 63 of the cam groove 60.

Figure 12:
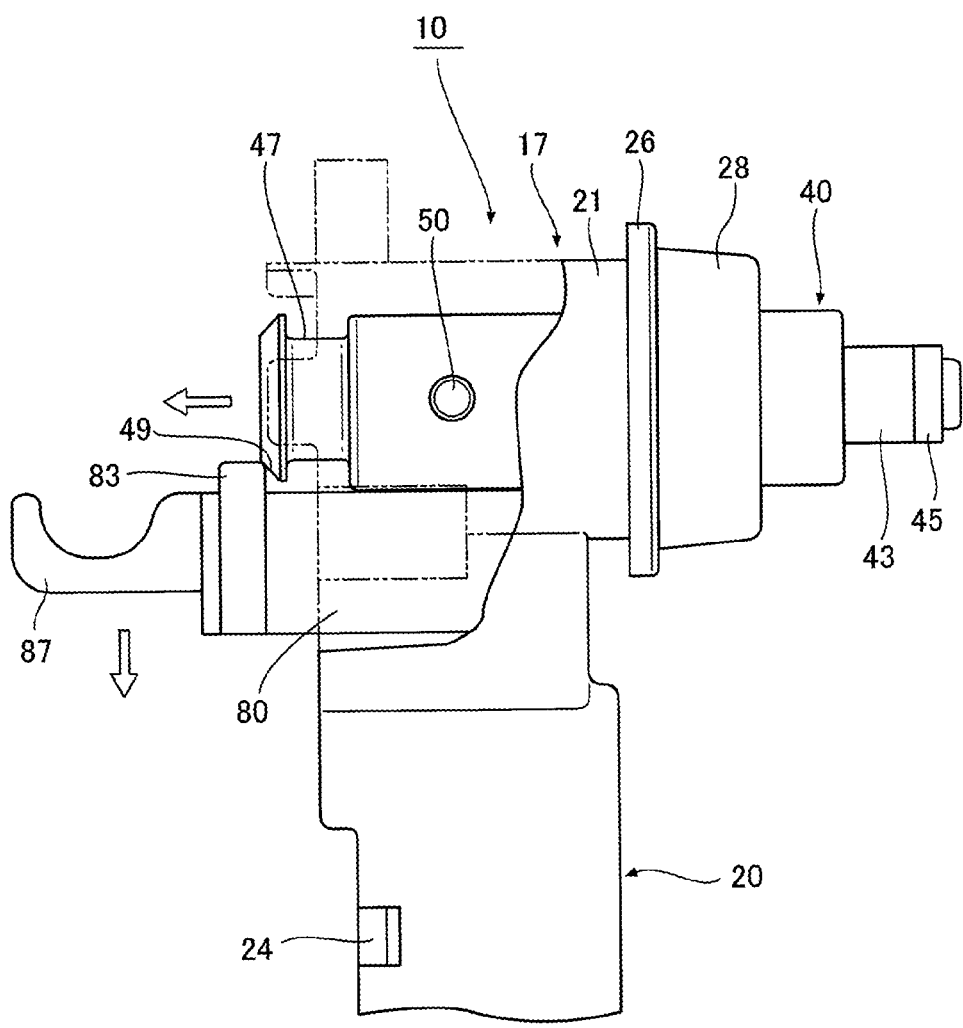
FIG. 12 is an enlarged view for illustrating an effect of a tapered surface of the movement member in the rotary type extension/retraction device.

Also, as shown in FIG. 12, a base end portion outer periphery of the movement member 40 is formed with a tapered surface 49 of which a height gradually decreases toward the base end. As shown in FIG. 12, in the protruding state of the movement member 40 from one end in the protruding direction of the cylindrical part 17, even though the drive device 70 is erroneously operated, the engagement member 80 is slid via the worm gear 71 and the engaging protrusion 83 is arranged at an outer side of the base end of the movement member 40, when the movement member 40 is pushed, the engaging protrusion 83 is pressed via the tapered surface 49, so that the engagement member 80 can be pushed down.

In the first embodiment, the outer periphery of the movement member 40 is formed with the protrusion 50 that is to be fitted in the cam groove 60. Here, the protrusions 50, 50 protrude from two places, which are located on the outer periphery near the base end portion of the movement member 40 and face each other in the circumferential direction (refer to FIG. 7).

Subsequently, the cam groove 60 in which the protrusions 50 are to be fitted is described.

As shown in FIGS. 6A to 6D and FIG. 8B, the cam groove 60 has a first fitting groove 61 configured to fit therein the protrusion 50 and to hold the movement member 40 in a state protruding from the cylindrical part 17, a second fitting groove 63 configured to fit therein the protrusion 50 and to hold the movement member 40 in a state pulled in the cylindrical part 17, a first guide groove 65 configured to, when the movement member 40 is pressed against an urging force of the spring member 55 in a state where the protrusion 50 is fitted in the first fitting groove 61, guide the protrusion 50 from the first fitting groove 61 to the second fitting groove 63, and inclined in one direction of the inner periphery of the cylindrical part 17, and a second guide groove 67 configured to, when the movement member 40 is pressed against the urging force of the spring member 55 in a state where the protrusion 50 is fitted in the second fitting groove 63, disengage the protrusion 50 from the second fitting groove 63 and to guide the protrusion to the first fitting groove 61, and inclined in one direction of the inner periphery of the cylindrical part 17, and the first fitting groove 61, the first guide groove 65, the second fitting groove 63 and the second guide groove 67 are arranged circumferentially along the inner periphery of the cylindrical part 17 in this order.

Figures 8A, 8B:
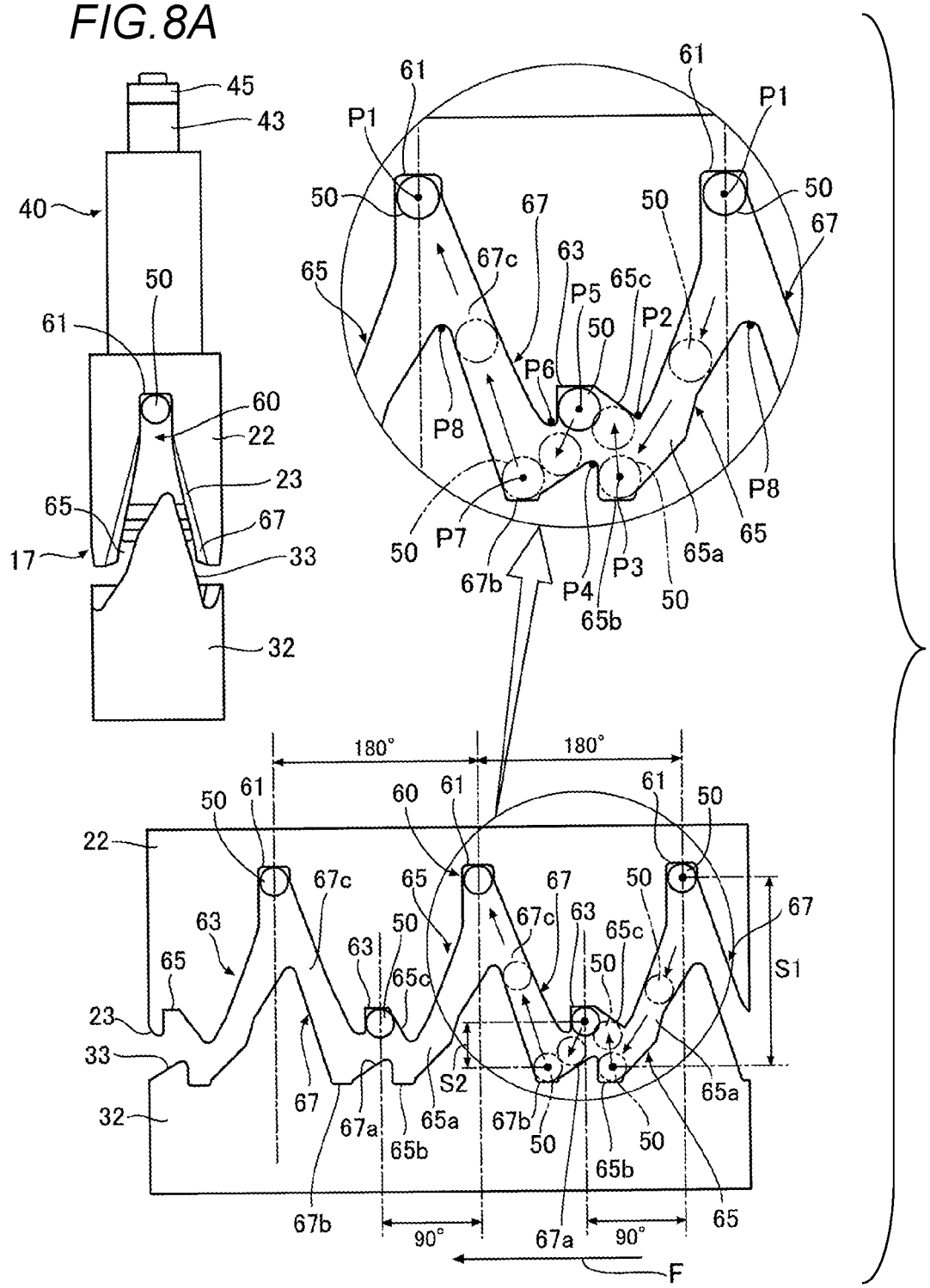

In the meantime, regarding the first guide groove and the second guide groove of the present invention, the description "inclined in "one direction" of the inner periphery of the cylindrical part" means that directions of both the grooves of the first guide groove and the second guide groove along a direction in which the protrusion is to be guided (a direction in which the protrusion is to be guided from the first fitting groove to the second fitting groove or a direction in which the protrusion is to be guided from the second fitting groove to the first fitting groove; refer to the arrow in each guide groove, in FIG. 8B) are inclined relative to one common circumferential direction (leftward circumferential direction or rightward circumferential direction; refer to an arrow F in FIG. 8B) from predetermined positions on the inner periphery of the cylindrical part, as shown in a development view of FIG. 8B.

In the first embodiment, as shown in FIG. 8B, the first guide groove 65 is inclined obliquely downward and leftward and the second guide groove 67 is inclined obliquely upward and leftward. However, the directions in which both the grooves 65, 67 are to guide the protrusion are commonly inclined relative to the leftward circumferential direction (refer to the arrow F) of the inner periphery of the cylindrical part.

In the meantime, the directions of the first guide groove and the second guide groove along the direction in which the protrusion is to be guided may be inclined relative to the leftward circumferential direction of the outer periphery of the movement member. Also, the directions of the first guide groove and the second guide groove along the direction in which the protrusion is to be guided may be inclined relative to the rightward circumferential direction of the inner periphery of the cylindrical part or the outer periphery of the movement member.

In FIG. 2, FIG. 3, FIGS. 6A to 6D and FIGS. 8A and 8B, in order to easily understand the structure, for the sake of convenience, the first cylinder part 21 of the first body part 20 is omitted and the step-shaped protruding portion 22 is shown with the solid line. Also, in FIGS. 6A to 6D and FIGS. 8A and 8B, the second cylinder part 31 of the second body part 30 is omitted.

As shown in FIG. 8B, the first fitting groove 61 and the second fitting groove 63 have a concave groove shape formed on an end face of the step-shaped protruding portion 22 of the first body part 20. Also, the first fitting groove 61 is arranged at an axial leading end-side of the cylindrical part 17 (a protruding direction-side of the movement member), the second fitting groove 63 is arranged at a position closer to a substantially axial center of the cylindrical part 17 than the first fitting groove 61, and is positionally displaced circumferentially with respect to the first fitting groove 61, so that both the fitting grooves 61, 63 are positionally displaced in the axial and circumferential directions of the cylindrical part 17. In the meantime, the position of the second fitting groove 63 may be located at an axial base end-side of the cylindrical part 17 (an opposite side to the protruding direction of the movement member) and is not particularly limited.

In the meantime, as shown in FIG. 8B, the first guide groove 65 has a guide groove 65a, which communicates with the first fitting groove 61, extends with being inclined toward the axial base end-side of the cylindrical part 17 and toward the second fitting groove 63 and is configured to positionally displace the protrusion 50 disengaged from the first fitting groove 61 in one circumferential direction while guiding the protrusion to the axial base end-side of the cylindrical part 17, a stopper portion 65b, which is provided continuously to the guide groove 65a, is arranged at a position closer to the axial base end-side of the cylindrical part 17 than the second fitting groove 63 and is configured to restrain the protrusion 50 guided to the guide groove 65a from moving toward the axial base end-side of the cylindrical part 17, and a guide surface 65c, which is formed at a position facing the stopper portion 65b, extends with being inclined so as to return from an end portion of the guide groove 65a toward the second fitting groove 63 and is configured to guide the protrusion 50 to the second fitting groove 63. In the meantime, the stopper portion 65b is formed at the end face 33—side of the step-shaped protruding portion 32 of the second body part 30, the guide surface 65c is formed at the end face 23—side of the step-shaped protruding portion 22 of the first body part 20, and the guide groove 65a is formed at both the end faces 23, 33 of the step-shaped protruding portion 22 of the first body part 20 and the step-shaped protruding portion 32 of the second body part 30.

Also, as shown in FIG. 8B, the second guide groove 67 has a guide surface 67a, which is provided continuously to the stopper portion 65b of the first guide groove 65 at a position closer to the axial base end-side of the cylindrical part 17 than the second fitting groove 63 and facing the second fitting groove 63, is inclined to be gradually spaced from the second fitting groove 63 and is configured to positionally displace the protrusion 50 disengaged from the second fitting groove 63 in one circumferential direction of the cylindrical part 17, a stopper portion 67b, which is provided continuously to the guide surface 67a and is configured to restrain the protrusion 50 guided to the guide surface 67a from moving toward the axial base end-side of the cylindrical part 17, and a guide groove 67c, which is provided continuously to the second fitting groove 63 and the stopper portion 67b, extends with being inclined toward the first fitting groove 61 and is configured to guide the protrusion 50 to the first fitting groove 61. In the meantime, the guide surface 67a and the stopper portion 67b are formed at the end face 33—side of the step-shaped protruding portion 32 of the second body part 30, and the guide groove 67c is formed at both the end faces 23, 33 of the step-shaped protruding portion 22 of the first body part 20 and the step-shaped protruding portion 32 of the second body part 30.

Also, in the first embodiment, as shown in FIG. 8B, the first fitting groove 61 and the second fitting groove 63 are formed to face each other in the circumferential direction of the cylindrical part 17 with an interval of 180° on the inner periphery of the cylindrical part 17. Also, the second fitting groove 63 is formed on the inner periphery of the cylindrical part 17 with being positionally displaced with respect to the first fitting groove 61 in the circumferential direction of the cylindrical part 17 with an interval of 90°. However, the arrangement intervals of the first fitting groove and the second fitting groove are not particularly limited. Also, the structures of the first guide groove and the second guide groove are not limited to the above-described structures.

Also, when the extension/retraction device 10 is used for the opening and closing structure of the fuel lid, like the first embodiment, a press-fitting stroke S1 of the movement member 40 for guiding the protrusion 50 from the first fitting groove 61 to the second fitting groove 63 (i.e., a distance from the first fitting groove 61 to the stopper portion 65b of the first guide groove 65) is preferably 12 to 20 mm, from standpoints of securing a gap in which a finger can enter the opening and closing member 5 (fuel lid) and the like, as shown in FIG. 8B. Also, a press-fitting stroke S2 of the movement member 40 for guiding the protrusion 50 from the second fitting groove 63 to the first fitting groove 61 (i.e., a distance from the second fitting groove 63 to the stopper portion 67b of the second guide groove 67) is preferably 3 to 8 mm, although it is different depending on a shape of the protrusion 50. Also, the press-fitting stroke S1 is preferably greater than the press-fitting stroke S2.

Also, in the first embodiment, the outer periphery of the movement member 40 is formed with the protrusion 50, and the inner periphery of the cylindrical part 17 is formed with the cam groove 60. To the contrary, in a reference example shown in FIG. 13 and FIG. 14, the inner periphery of the cylindrical part is formed with the protrusion, and the outer periphery of the movement member is formed with the cam groove.

Subsequently, an operation of the movement member 40 is described in association with operations of the cam groove 60 and the protrusion 50.

Figures 6A, 6B, 6C, 6D:
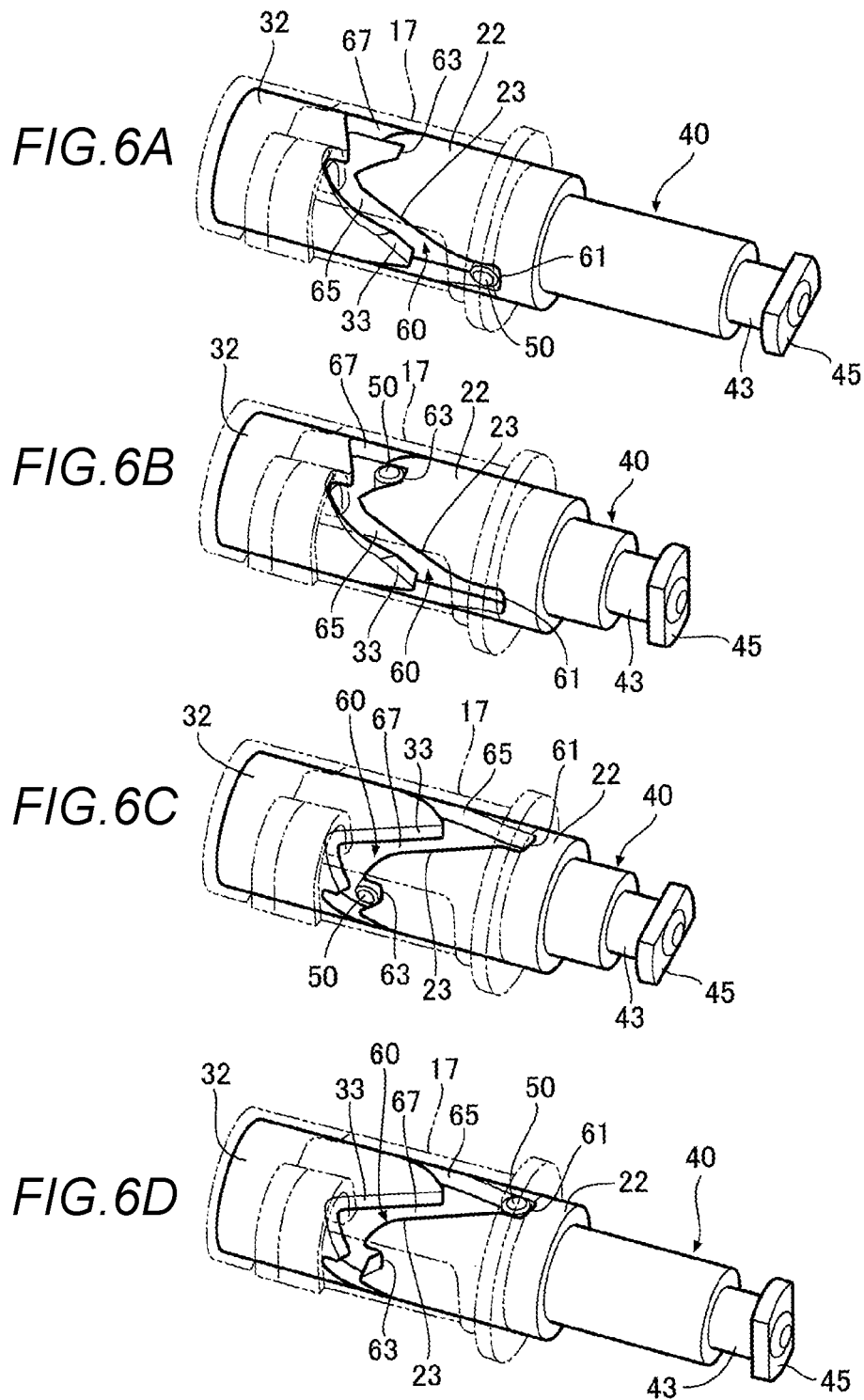

As shown in FIG. 6A, in the state where the protrusion 50 is fitted in the first fitting groove 61 of the cam groove 60, the movement member 40 protrudes from one end in the protruding direction of the cylindrical part 17. When the movement member 40 is pressed against the urging force of the spring member 55 from this state, the protrusion 50 is disengaged from the first fitting groove 61 of the cam groove 60 and is pressed and guided to the guide groove 65a of the first guide groove 65 and the movement member 40 is pulled in the cylindrical part 17 while rotating, as shown with the virtual line in FIG. 8B. When the movement member 40 is further pressed, the protrusion 50 is contacted to the stopper portion 65b of the first guide groove 65, so that the further press-fitting is restrained. Thereafter, the movement member 40 is again pressed to one end-side in the protruding direction of the cylindrical part 17 by the urging force of the spring member 55, and the protrusion 50 is pressed and guided to the guide surface 65c of the first guide groove 65. Then, the protrusion 50 is fitted in the second fitting groove 63, so that the movement member 40 is held in the state where it is pulled-in from one end in the protruding direction of the cylindrical part 17 (refer to FIG. 6B and FIG. 6C).

When the movement member 40 is again pressed against the urging force of the spring member 55 in this state, the protrusion 50 is disengaged from the second fitting groove 63 of the cam groove 60 and is pressed and guided to the guide surface 67a of the second guide groove 67, the movement member 40 is slightly pulled in the cylindrical part 17 while rotating and the protrusion 50 is contacted to the stopper portion 67b of the second guide groove 67 and is restrained from being further press-fitted, as shown with the virtual line in FIG. 8B. Also, the movement member 40 is again pressed to one end-side in the protruding direction of the cylindrical part 17 by the urging force of the spring member 55, the protrusion 50 is introduced and guided to the guide groove 67c of the second guide groove 67, and the movement member 40 protrudes from one end in the protruding direction of the cylindrical part 17 while rotating. Then, the protrusion 50 is fitted in the first fitting groove 61, so that the movement member 40 is held in the state where it protrudes from one end in the protruding direction of the cylindrical part 17 (refer to FIG. 6D).

In this way, the movement member 40 is pressed, so that the protrusion 50 is repetitively moved in order of the first fitting groove 61, the first guide groove 65, the second fitting groove 63 and the second guide groove 67 and the movement member 40 is alternately held in the protruding state or the pulled-in state. In the meantime, since the first guide groove 65 and the second guide groove 67 are inclined in one circumferential direction of the cylindrical part 17, the movement member 40 is rotated only in one circumferential direction of the cylindrical part 17 and is not rotated in the other circumferential direction.

The configuration with which the protrusion 50 is repetitively moved in order of the first fitting groove 61, the first guide groove 65, the second fitting groove 63 and the second guide groove 67 as described above is described in more detail.

That is, as shown in a partially enlarged view of FIG. 8B, a protrusion center position of the first fitting groove 61 upon the fitting of the protrusion 50 is denoted as "P1", an end point of the guide groove 65a of the first guide groove 65 in one circumferential direction (a guide end position of the protrusion in the guide groove) is denoted as "P2", a protrusion center position of the stopper portion 65b of the first guide groove 65 upon the movement restraint of the protrusion 50 is denoted as "P3", an end point of the first guide groove 65 in one circumferential direction (a guide end position of the protrusion in the first guide groove) is denoted as "P4", a protrusion center position of the second fitting groove 63 upon the fitting of the protrusion 50 is denoted as "P5", a start point of the second guide groove 67 in one circumferential direction (a guide start position of the protrusion in the second guide groove) is denoted as "P6", a protrusion center position of the stopper portion 67b of the second guide groove 67 upon the movement restraint of the protrusion 50 is denoted as "P7", and an end point of the second guide groove 67 in one circumferential direction (a guide end position of the protrusion in the second guide groove) is denoted as "P8". In this case, the first fitting groove 61, the first guide groove 65, the second fitting groove 63 and the second guide groove 67 are arranged along one direction of the inner periphery of the cylindrical part in this order so that the position P2 is arranged more closely to one direction lending end of the inner periphery of the cylindrical part than the position P1 (P1<P2), the position P3 is arranged more closely to one direction lending end of the inner periphery of the cylindrical part than the position P2 (P2<P3), the position P4 is arranged more closely to one direction lending end of the inner periphery of the cylindrical part than the position P3 (P3<P4), the position P5 is arranged more closely to one direction lending end of the inner periphery of the cylindrical part than the position P4 (P4<P5), the position P6 is arranged more closely to one direction lending end of the inner periphery of the cylindrical part than the position P5 (P5<P6), the position P7 is arranged more closely to one direction lending end of the inner periphery of the cylindrical part than the position P6 (P6<P7), the position P8 is arranged more closely to one direction lending end of the inner periphery of the cylindrical part than the position P7 (P7<P8), and the position P1 is arranged more closely to one direction lending end of the inner periphery of the cylindrical part than the position P8 (P8<P1), i.e., a relation of P1<P2<P3<P4<P5<P6<P7<P8<P1< . . . is to be satisfied.

The positions P1 to P8 are set for the first fitting groove 61, the first guide groove 65, the second fitting groove 63 and the second guide groove 67, as described above, so that when press-fitting the movement member 40, the protrusion 50 fitted in the first fitting groove 61 is guided to the guide groove 65a of the first guide groove 65, is restrained from moving by the stopper portion 65b and is then fitted in the second fitting groove 63 via the guide surface 65c, and the protrusion 50 is further guided to the guide surface 67a of the second guide groove 67, is restrained from moving by the stopper portion 67b, is then guided to the guide groove 67c and is again fitted in the first fitting groove 61.

Also, the protrusion 50 fitted in the first fitting groove 61 is press-fitted until it is contacted to the stopper portion 65b of the first guide groove 65, so that the protrusion is thus automatically guided to the second fitting groove 63 by the guide surface 65c of the first guide groove 65 and the urging force of the spring member 55. Also, the protrusion 50 fitted in the second fitting groove 63 is press-fitted until it is contacted to the stopper portion 67b of the second guide groove 67, so that the protrusion is thus automatically guided to the first fitting groove 61 by the guide groove 67c of the second guide groove 67 and the urging force of the spring member 55.

Also, in the first embodiment, as described above, the engagement part 7 provided on the inner surface of the opening and closing member 5 is formed with the engaging groove 8 (refer to FIG. 1). However, the engaging groove 8 is configured as follows, considering a relation with the engaging piece 45 provided to the movement member 40.

That is, as shown in FIG. 9, the engaging groove 8 is configured so that when the protrusion 50 is fitted in the first fitting groove 61 of the cam groove 60 and the movement member 40 is located at the rotation position in the protruding state from one end in the protruding direction of the cylindrical part 17 (refer to FIGS. 6A and 6D. In the meantime, FIGS. 6A and 6D are views, as seen from directions changed by 90°, and illustrate the same state), the longitudinal direction of the engaging piece 45 of the movement member 40 is parallel with the pair of inner walls of the engaging groove 8 (refer to FIG. 1), and the engaging piece can thus enter the opening 8a and can be inserted and separated into and from the engaging groove 8. Also, as shown in FIG. 10, when the protrusion 50 is fitted in the second fitting groove 63 of the cam groove 60 and the movement member 40 is located at the rotation position in the pulled-in state from one end in the protruding direction of the cylindrical part 17 (refer to FIGS. 6B and 6C. In the meantime, FIGS. 6B and 6C are views, as seen from directions changed by 90°, and illustrate the same state), the longitudinal direction of the engaging piece 45 of the movement member 40 is perpendicular to the pair of inner walls of the engaging groove 8, and the engaging piece enters the inner side 8b of the groove and is engaged to the narrow opening 8a without being disengaged.

That is, in the state where the protrusion 50 is fitted in the first fitting groove 61 of the cam groove 60, the engaging piece 45 is disengaged from the engaging groove 8 of the opening and closing member 5, and in the state where the protrusion 50 is fitted in the second fitting groove 63 of the cam groove 60, the engaging piece 45 is engaged to the engaging groove 8 of the opening and closing member 5.

Also, as described above, the extension/retraction device 10 of the first embodiment includes the engagement member 80 (refer to FIG. 2). The engagement member 80 operates as follows, due to the relation with the movement member 40.

That is, in the state where the protrusion 50 is fitted in the second fitting groove 63 of the cam groove 60 and the movement member 40 is pulled-in from one end in the protruding direction of the cylindrical part 17, when the engagement member 80 is moved toward the movement member 40 by the drive of the drive device 70, the engaging protrusion 83 of the engagement member 80 is engaged with the lock groove 47 of the movement member 40 (refer to FIG. 11), so that the movement member 40 cannot be further press-fitted.

Also, in the state where the movement member 40 is pulled-in from one end in the protruding direction of the cylindrical part 17 and the engaging protrusion 83 of the engagement member 80 is engaged with the lock groove 47 of the movement member 40, when the engagement member 80 is moved away from the movement member 40 by the drive of the drive device 70, the engaging protrusion 83 of the engagement member 80 is disengaged from the lock groove 47 of the movement member 40, so that the engagement is released.

Subsequently, a using method and operational effects of the extension/retraction device 10 having the above structure are described.

First, a mounting method of the extension/retraction device 10 is described. That is, the movement member 40 is inserted in the first cylinder part 21 of the first body part 20, the spring member 55 is inserted and arranged in the spring accommodation space 41 of the movement member 40, and the engagement member 80 and the drive device 70 are respectively arranged at predetermined places of the first body part 20. In this state, the convex portions 21b of the first body part 20 are aligned with the concave portions 31b of the second body part 30, and the second body part 30 is press-fitted to the first body part 20 so that the step-shaped protruding portion 32 of the second cylinder part 31 is inserted in the first cylinder part 21 and the spring support column 35 is inserted in the spring member 55. As a result, the convex portions 21b of the first body part 20 are fitted in the concave portions 31b of the second body part 30 and the engaging protrusions 24 of the first body part 20 are engaged to the engaging frame portions 34 of the second body part 30, so that the first body part 20 and the second body part 30 are mounted to each other. Then, the seal member 28 is mounted to the leading end outer periphery of the cylindrical part 17, so that the extension/retraction device 10 can be assembled.

At this time, as shown in FIG. 7, the step-shaped protruding portion 32 of the second cylinder part 31 is inserted in the first cylinder part 21. However, the step-shaped protruding portion 32 and the step-shaped protruding portion 22 of the first cylinder part 21 are not coupled to each other in the axial direction of the cylindrical part 17, and the first body part 20 and the second body part 30 are mounted to each other by the engaging protrusions 24 of the first body part 20 and the engaging frame portions 34 of the second body part 30. Also, since the inner diameter of the step-shaped protruding portion 32 is the same as the inner diameter of the step-shaped protruding portion 22 of the first cylinder part 21, it is possible to reduce the diameter of the cylindrical part 17, as compared to a structure where both cylinder parts are engaged to each other by inserting one cylinder part into the other cylinder part, for example.

Also, in the first embodiment, as shown in FIG. 3, FIGS. 6A to 6D and FIG. 7, the body member 15 is configured by the first body part 20 and the second body part 30 divided in the axial direction of the cylindrical part 17, and in the state where the first body part 20 and the second body part 30 are mounted to each other, the cam groove 60 is formed by the end faces 23, 33 of the first body part 20 and the second body part 30 facing each other. Therefore, when forming the cylindrical part 17, the axial demolding is possible, so that it is possible to simplify a mold structure for forming the cam groove 60. Also, since both sidewalls of the cam groove 60 are formed by the end faces 23, 33 of the first body part 20 and the second body part 30 facing each other, it is possible to increase an angle of both sidewalls relative to a groove bottom, so that the protrusion 50 configured to move along the cam groove 60 is difficult to be disengaged from the cam groove 60 and can smoothly move without rattling along the cam groove 60.

Also, in the first embodiment, the protrusion 50 is formed on the outer periphery of the movement member 40, the cam groove 60 is formed on the inner periphery of the cylindrical part 17 of the body member 15, the movement member 40 has the substantially cylindrical shape where the base end-side opposite to the protruding direction from one end of the cylindrical part 17 of the body member 15 is concave, and the spring accommodation space 41 in which the spring member 55 is arranged is provided in the movement member (refer to FIG. 7). Therefore, it is possible to reduce an outer diameter of the movement member 40, so that it is possible to make the extension/retraction device 10 compact.

The extension/retraction device 10 operates, as follows. That is, as shown in FIG. 1, in the state where the opening and closing member 5 is opened from the opening of the fixed member 1, the protrusion 50 is fitted in the first fitting groove 61 of the cam groove 60 (refer to FIG. 6A) and the movement member 40 is held in the protruding state from one end in the protruding direction of the cylindrical part 17. When the opening and closing member 5 is closed from this state, the engaging piece 45 of the movement member 40 enters the engaging groove 8 of the engagement part 7 of the opening and closing member 5 (refer to FIG. 9) and the movement member 40 is pressed against the urging force of the spring member 55 by the opening and closing member 5.

Then, the protrusion 50 is disengaged from the first fitting groove 61 of the cam groove 60 and is pressed and guided to the guide groove 65a of the first guide groove 65, the movement member 40 is pulled in the cylindrical part 17 while rotating, the protrusion 50 is contacted to the stopper portion 65b of the first guide groove 65, the movement member 40 is then again pressed to one end-side in the protruding direction of the cylindrical part 17 by the urging force of the spring member 55, and the protrusion 50 is pressed and guided to the guide surface 65c of the first guide groove 65. Then, the protrusion 50 is fitted in the second fitting groove 63, so that the movement member 40 is held in the pulled-in state from one end in the protruding direction of the cylindrical part 17 (refer to FIG. 6B and FIG. 6C), the engaging piece 45 is rotated and engaged to the engaging groove 8 of the opening and closing member 5 (refer to FIG. 10) and the opening and closing member 5 is held in the closed state.

Figure 11:
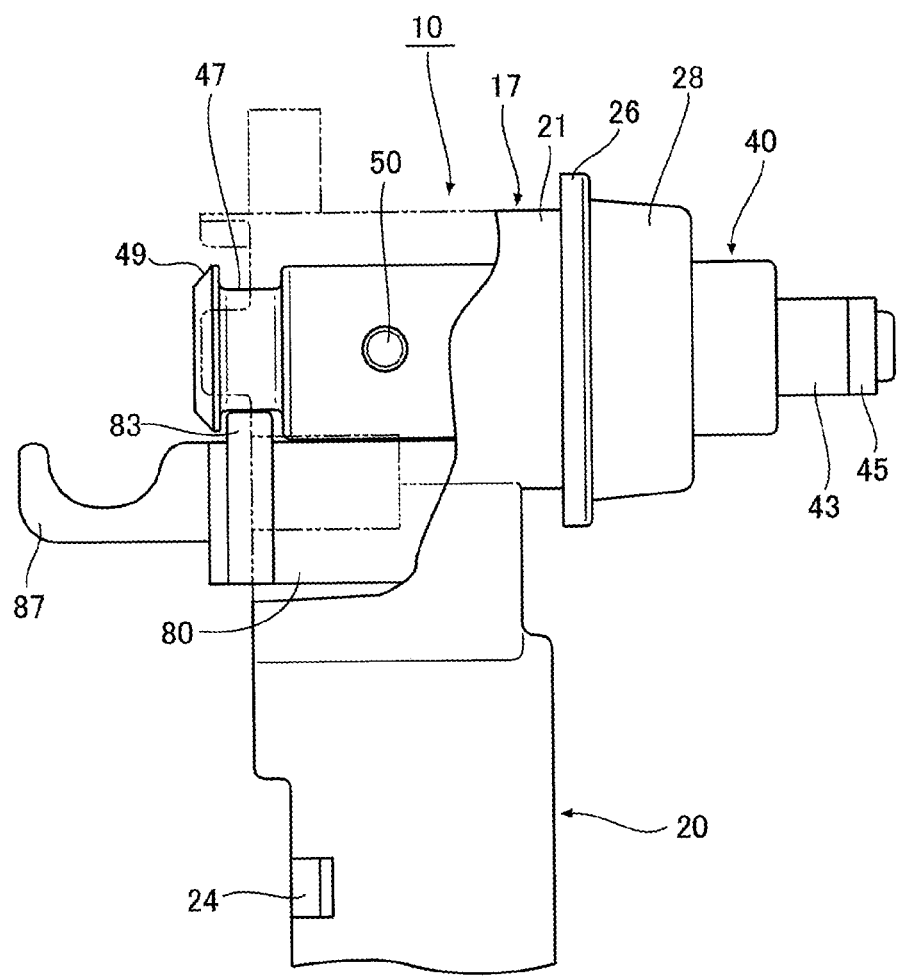
FIG. 11 is an enlarged view illustrating a state where an engaging protrusion of an engagement member is engaged with a lock groove of the movement member in the rotary type extension/retraction device.

In the above state, when the worm gear 71 of the drive device 70 is rotated in the predetermined direction to slide the engagement member 80 in a direction of coming close to the movement member 40, so that the engaging protrusion 83 of the engagement member 80 is engaged with the lock groove 47 of the movement member 40 and the movement member 40 cannot be thus further press-fitted, as shown in FIG. 11. As a result, the protrusion 50 cannot be disengaged from the second fitting groove 63 of the cam groove 60 and the opening and closing member 5 can be locked in the closed state. Also, when the worm gear 71 of the drive device 70 is rotated in a reverse direction to slide the engagement member 80 in a direction of getting away from the movement member 40, the engaging protrusion 83 is disengaged from the lock groove 47 of the movement member 40. Thereby, the press fitting-impossible state of the movement member 40 is released, so that the lock state of the opening and closing member 5 can be released. Also, in the extension/retraction device 10, since a so-called lifter consisting of the movement member 40 configured to lift the opening and closing member 5 and the lock device configured to lock the movement member 40 so that it cannot be press-fitted can be integrated, it is possible to simplify the structure and to make the device compact, as compared to a structure where the lifter and the lock device are separately provided.

When the opening and closing member 5 is press-fitted from the above state and the movement member 40 is thus again pressed against the urging force of the spring member 55, the protrusion 50 is disengaged from the second fitting groove 63 of the cam groove 60 and is pressed and guided to the guide surface 67a of the second guide groove 67, the movement member 40 is slightly pulled in the cylindrical part 17 while rotating, the protrusion 50 is contacted to the stopper portion 67b of the second guide groove 67, the movement member 40 is then again pressed to one end-side in the protruding direction of the cylindrical part 17 by the urging force of the spring member 55, the protrusion 50 is pressed and guided to the guide groove 67c of the second guide groove 67, and the movement member 40 protrudes from one end in the protruding direction of the cylindrical part 17 while rotating. Then, the protrusion 50 is fitted in the first fitting groove 61, so that the movement member 40 is held in the protruding state from one end in the protruding direction of the cylindrical part 17 (refer to FIG. 6D). Also, the engaging piece 45 is rotated, so that the longitudinal direction thereof is aligned with the groove direction of the engaging groove 8 of the opening and closing member 5 (refer to FIG. 9) and the lock in the closed state of the opening and closing member 5 is released. Also, the opening and closing member 5 is pressed by the movement member 40, so that the opening and closing member 5 is lifted from the opening of the fixed member 1 by a predetermined height (lifter operation). As a result, the opening and closing member 5 can be manually opened.

Like this, in the first embodiment, when the opening and closing member 5 is pressed in the closing direction, the engaging piece 45 provided at the leading end-side of the movement member 40 is inserted in the engaging groove 8 of the opening and closing member 5, and the movement member 40 is pressed to the opening and closing member 5 and is pulled in the cylindrical part 17 while rotating. Then, when the protrusion 50 is fitted in the second fitting groove 63 of the cam groove 60, the engaging piece 45 having rotated together with the movement member 40 is engaged to the engaging groove 8 of the opening and closing member 5 (refer to FIG. 10), so that it is possible to hold the opening and closing member 5 in the closed state. In this state, when the opening and closing member 5 is again pressed, the protrusion 50 is disengaged from the second fitting groove 63 of the cam groove 60, the movement member 40 protrudes from one end in the protruding direction of the cylindrical part 17 while rotating, and the protrusion 50 is again fitted in the first fitting groove 61 of the cam groove 60. At this time, since the engaging piece 45 of the movement member 40 is arranged at an angle at which it can be inserted and separated to and from the engaging groove 8 of the opening and closing member 5, the engagement between the movement member 40 and the opening and closing member 5 is released, so that the opening and closing member 5 can be opened.

Figure 15:
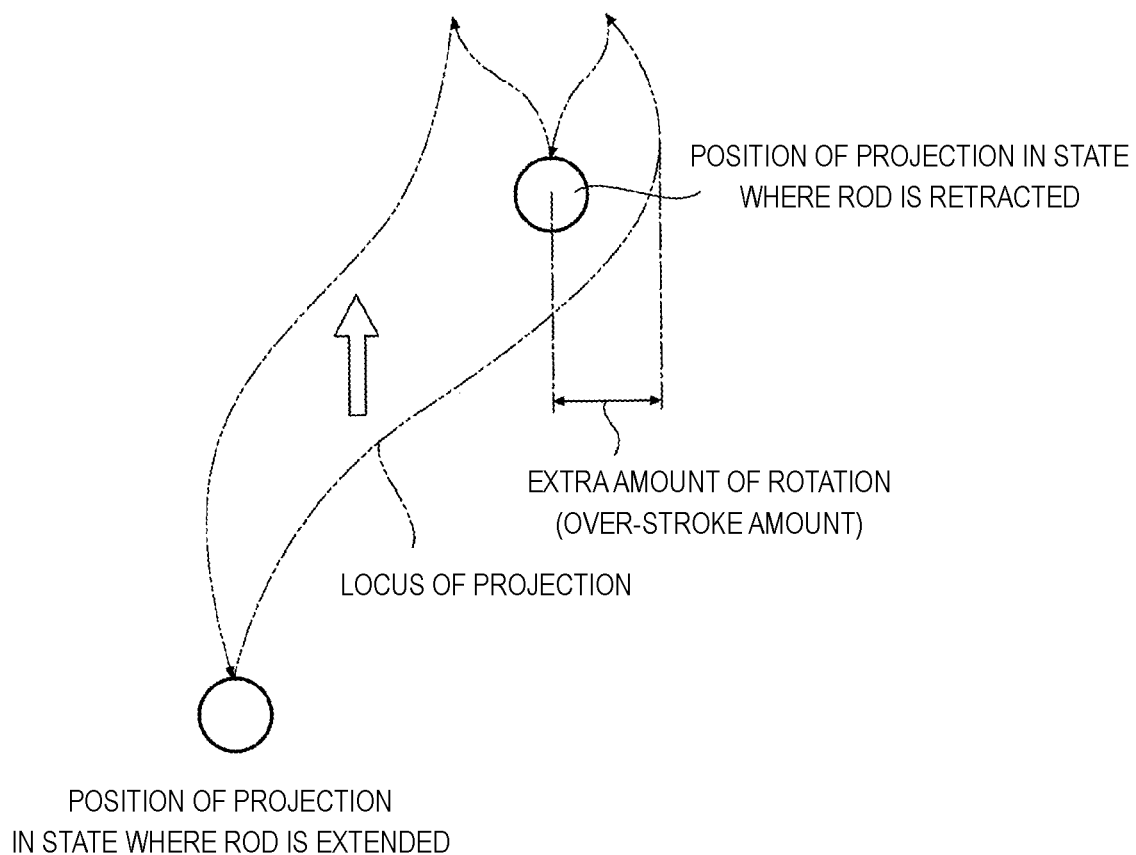
FIG. 15 illustrates a locus of a projection in a lock device having a heart cam groove structure of the related art.

In the extension/retraction device 10, the movement member 40 is pressed, so that the protrusion 50 is repetitively moved in order of the first fitting groove 61, the first guide groove 65, the second fitting groove 63 and the second guide groove 67 and the movement member 40 can be thus alternately held in the protruding state or in the pulled-in state. Also, since the movement of the protrusion 50 is made along the first guide groove 65 and the second guide groove 67 arranged circumferentially along the inner periphery of the cylindrical part 17, it is not necessary to over-stroke the rod in the rotating direction and to guide the same in the concave part of the heart cam groove, like the heart cam groove in the lock structure of Patent Document 1 as shown in FIG. 15, so that it is possible to reduce the sliding resistance of the protrusion 50.

Also, in the extension/retraction device 10, the cam groove 60 in which the protrusion 50 is to slide is provided with the first guide groove 65 and the second guide groove 67 inclined in one direction on the inner periphery of the cylindrical part 17. Therefore, when protruding or pulling-in the movement member 40 from one end in the protruding direction of the cylindrical part 17, the protrusion 50 is guided to the inclined first guide groove 65 and second guide groove 67, so that the movement member 40 can be gradually rotated and the rotation operation of the movement member 40 can be thus smoothly performed. As a result, when the movement member 40 is provided with the engaging piece 45, the movement member is securely engaged with the engaging groove 8 of the opening and closing member 5 while the engagement part 7 of the opening and closing member 5 is pulled-in by the rotation of the engaging piece 45, so that the opening and closing member 5 can be securely closed with respect to the opening of the fixed member 1. In the meantime, in the case of a cam groove that is not provided with an inclined guide groove and is configured by a combination of a long groove and a shallow groove, when the protrusion moves toward the shallow groove with overriding the long groove, the movement member is rapidly rotated when the protrusion overrides the long groove in the structure where the movement member can rotate. Therefore, in some cases, the engaging piece may not be engaged to the engaging groove of the opening and closing member.

Figure 13:
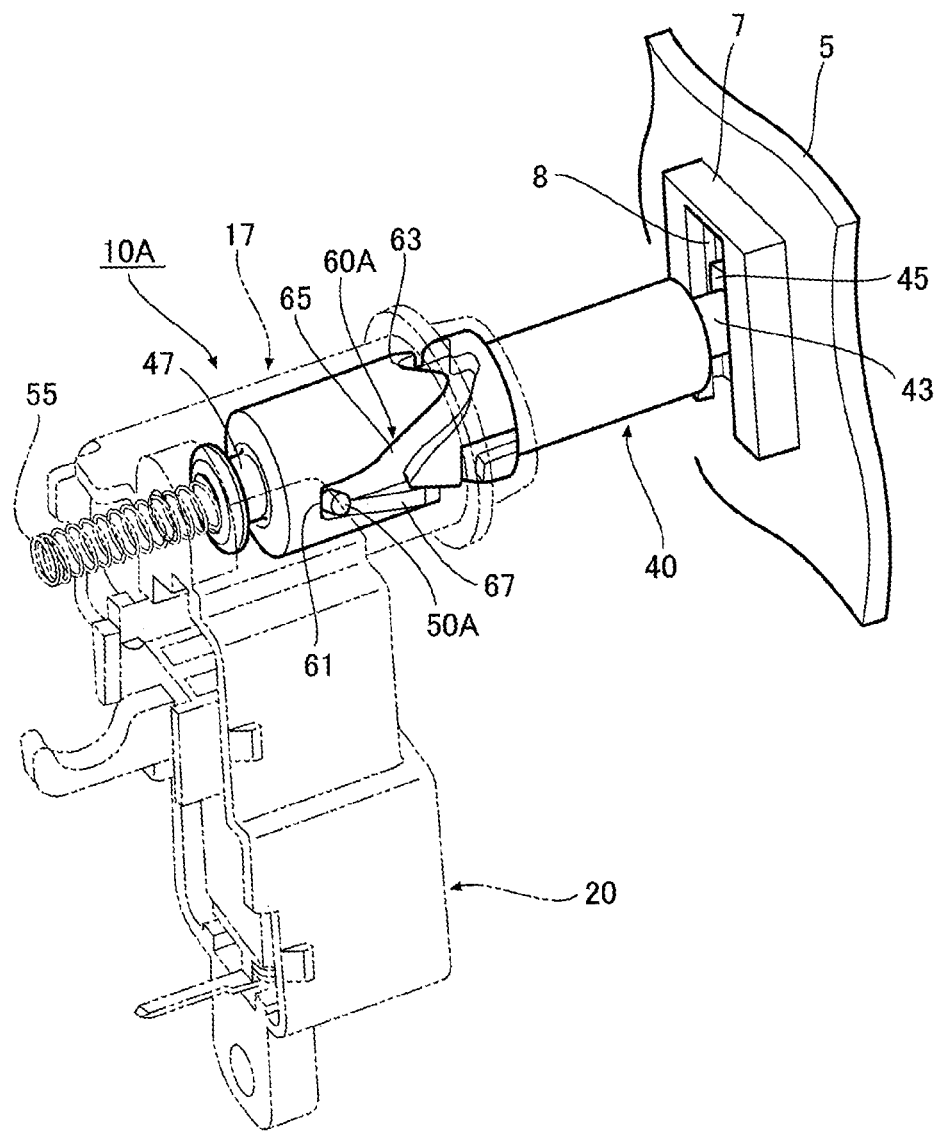
FIG. 13 is an enlarged perspective view of main parts illustrating a reference example of the rotary type extension/retraction device of the present invention.
Figure 14:
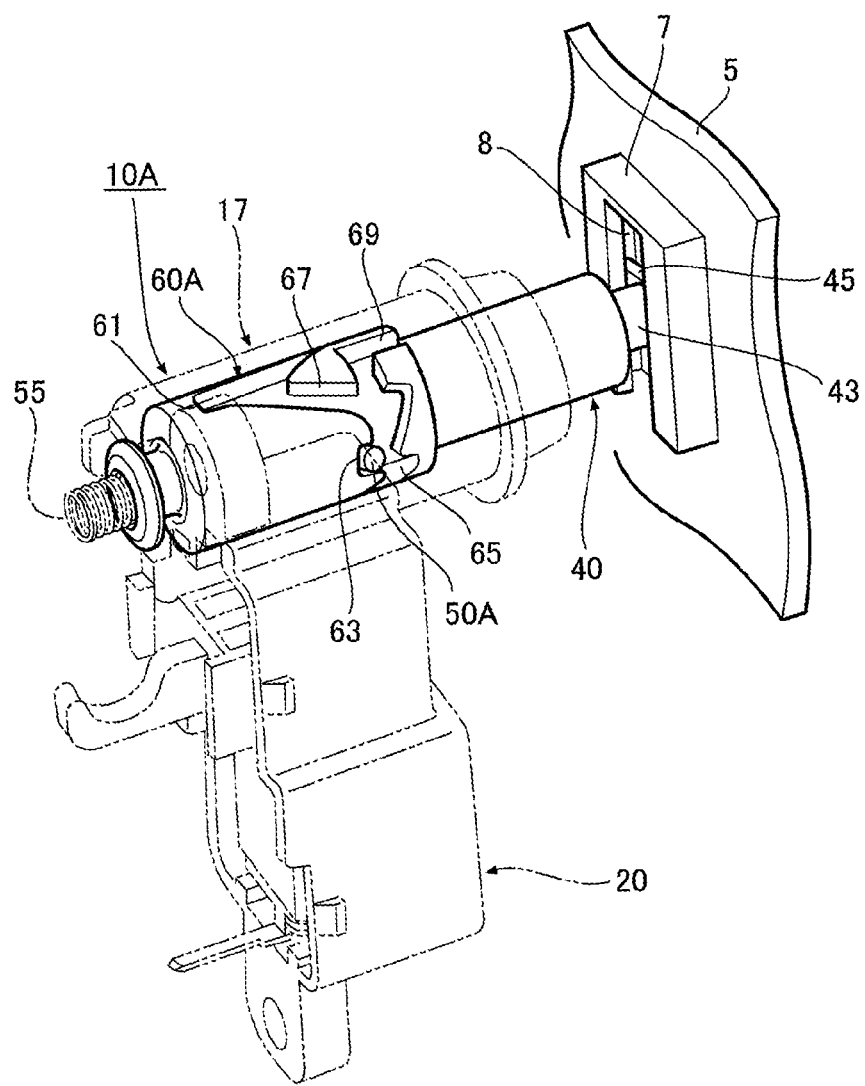
FIG. 14 is an enlarged perspective view of main parts illustrating the pulled-in state of the movement member from the cylindrical part in the rotary type extension/retraction device.

FIG. 13 and FIG. 14 illustrate a reference example of the rotary type extension/retraction device of the present invention. In the meantime, the substantially same parts as the first embodiment are denoted with the same reference numerals and the descriptions thereof are omitted.

A rotary type extension/retraction device 10A (hereinafter, referred to as "extension/retraction device 10A") has a protrusion 50A protruding from the inner periphery of the cylindrical part 17, and the outer periphery of the movement member 40 is formed with a cam groove 60A in which the protrusion 50A is to be fitted.

In the meantime, in FIG. 13 and FIG. 14, in order to easily understand the structure, for the sake of convenience, the cylindrical part 17 is shown with the virtual line.

Also, like the cam groove 60 of the first embodiment, the cam groove 60A formed on the outer periphery of the movement member 40 has a first fitting groove 61 configured to fit therein the protrusion 50A and to hold the movement member 40 in a state protruding from the cylindrical part 17, a second fitting groove 63 configured to fit therein the protrusion 50A and to hold the movement member 40 in a state pulled in the cylindrical part 17, a first guide groove 65 configured to, when the movement member 40 is pressed against an urging force of the spring member 55 in a state where the protrusion 50A is fitted in the first fitting groove 61, guide the protrusion 50A from the first fitting groove 61 to the second fitting groove 63, and inclined in one direction of the inner periphery of the cylindrical part 17, and a second guide groove 67 configured to, when the movement member 40 is pressed against the urging force of the spring member 55 in a state where the protrusion 50A is fitted in the second fitting groove 63, guide the protrusion 50A from the second fitting groove 63 to the first fitting groove 61, and inclined in one direction of the inner periphery of the cylindrical part 17, and the first fitting groove 61, the first guide groove 65, the second fitting groove 63 and the second guide groove 67 are arranged circumferentially along the inner periphery of the cylindrical part 17 (refer to FIG. 13 and FIG. 14) in this order.

Also, as shown in FIG. 14, the second guide groove 67 is provided on the way with a protrusion insertion groove 69 for receiving the protrusion 50A provided on the inner periphery of the cylindrical part 17. Also, the first fitting groove 61 of the cam groove 60A is arranged at the base end-side of the movement member 40 (an opposite side to the protruding direction from one end of the cylindrical part 17), and the second fitting groove 63 is arranged at a position closer to a side of the movement member 40 in the protruding direction from one end of the cylindrical part 17 than the first fitting groove 61.

As shown in FIG. 13, in the state where the protrusion 50A is fitted in the first fitting groove 61 of the cam groove 60A, the movement member 40 protrudes from one end in the protruding direction of the cylindrical part 17. When the movement member 40 is pressed against the urging force of the spring member 55 from this state, the protrusion 50A is disengaged from the first fitting groove 61 of the cam groove 60A and is guided to the first guide groove 65, the movement member 40 is pulled in the cylindrical part 17 while rotating and is fitted in the second fitting groove 63, so that the movement member 40 is held in the pulled-in state from one end in the protruding direction of the cylindrical part 17, as shown in FIG. 14. When the movement member 40 is again pressed against the urging force of the spring member 55 in this state, the protrusion 50A is disengaged from the second fitting groove 63 of the cam groove 60A and is guided to the second guide groove 67, the movement member 40 protrudes from one end in the protruding direction of the cylindrical part 17 while rotating and the protrusion 50A is fitted in the first fitting groove 61, so that the movement member 40 is again held in the protruding state from one end in the protruding direction of the cylindrical part 17, as shown in FIG. 13.

FIGS. 16 to 22 illustrate a second embodiment of the rotary type extension/retraction device of the present invention. In the meantime, the substantially same parts as the first embodiment are denoted with the same reference numerals and the descriptions thereof are omitted.

Figure 16:
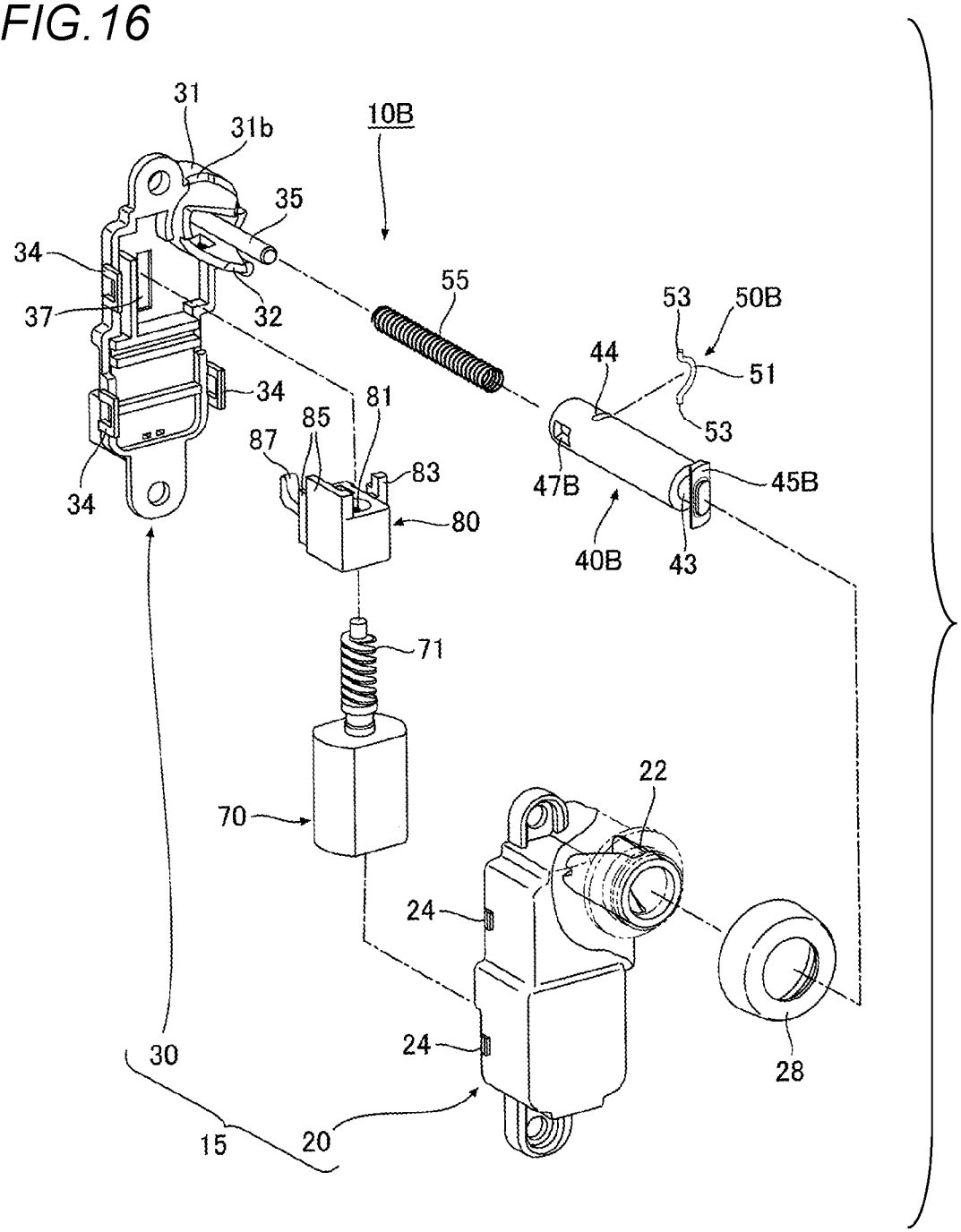
FIG. 16 is an exploded perspective view illustrating another embodiment of the rotary type extension/retraction device of the present invention.

As compared to the extension/retraction device 10 of the first embodiment where the movement member 40 is provided integrally with the protrusion 50 (refer to FIG. 2 and FIG. 4), in a rotary type extension/retraction device 10B of the second embodiment (hereinafter, referred to as "extension/retraction device 10B"), a protrusion 50B is provided separately from a movement member 40B, as shown in FIGS. 16 to 18.

Figure 17A:
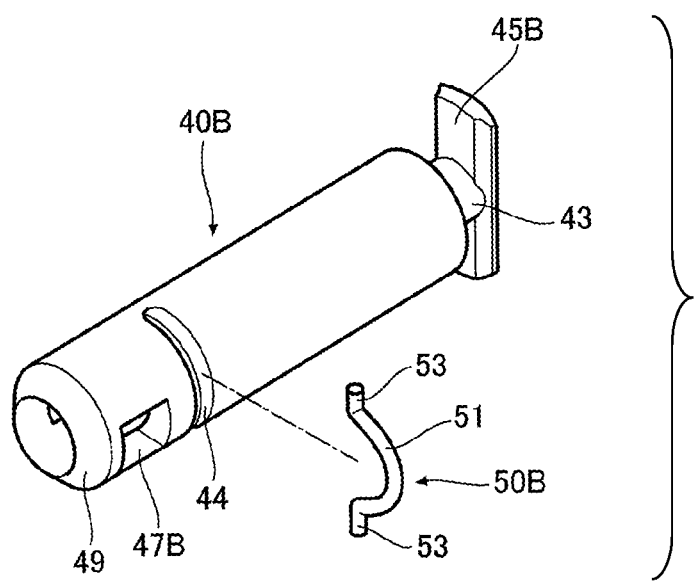
Figure 17B:
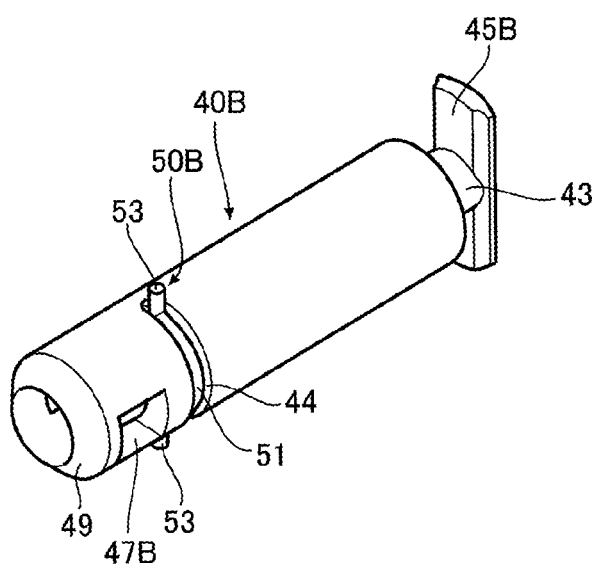

Also, as shown in FIGS. 17A and 17B and FIGS. 18A to 18C, the movement member 40B has a mounting groove 44 for mounting thereto the protrusion 50B. In the second embodiment, the mounting groove 44 has a circular arc shape along an outer periphery of the movement member 40B, in conformity with the movement member 40B having a circular outer peripheral surface (refer to FIG. 17A and FIG. 20). Also, as shown in FIG. 16 and FIGS. 17A and 17B, lock grooves 47B, 47B having a rectangular shape are respectively formed at the base end-side of the movement member 40 and at facing places of the outer periphery along an extension direction of a band-shaped engaging piece 45B, and the engaging protrusion 83 of the engagement member 80 is to be engaged and disengaged to and from the lock groove 47B.

In the meantime, the protrusion 50B of the second embodiment has a curved portion 51 curved to form a circular arc shape suitable for the mounting groove 44 and to be inserted in the mounting groove 44, and protruding portions 53, 53 extending from both end portions of the curved portion 51 in an outer diameter direction of the movement member 40B.

Figure 20:
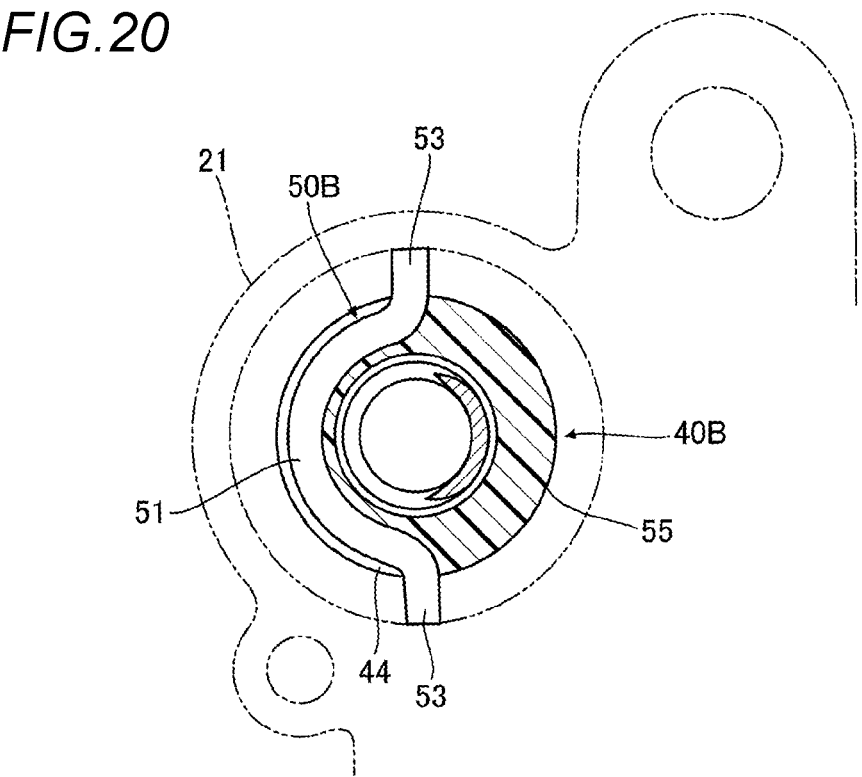
FIG. 20 is a sectional view of main parts taken through the movement member and the cylindrical part of the rotary type extension/retraction device in a direction perpendicular to an axial direction thereof.

In the state where the protrusion 50B is mounted to the mounting groove 44, the pair of protruding portions 53, 53 is arranged at two places facing each other in the circumferential direction of the movement member 40B, as shown in FIG. 17B and FIG. 20. The pair of protruding portions 53, 53 is respectively fitted in the cam groove 60 formed by the end faces of the first body part 20 and the second body part 30 facing each other. In the meantime, the protruding portion 53 may be provided at only one end portion of the curved portion 51. Also, the protruding portion 53 has a circular section, like the protrusion 50 of the first embodiment.

The protrusion 50B may be formed by appropriately bending a metal rod having a circular section and made of a metal material such as stainless steel, spring steel and the like. However, the protrusion is not limited to the metal material, may be formed of a synthetic resin such as polyacetal (POM), poly phenylene sulfide (PPS), polyether ether ketone (PEEK) and the like or a synthetic resin in which the above synthetic resin is reinforced with glass, carbon fiber and the like, and is provided as a separate member from the movement member. However, the protrusion is preferably formed of a material harder than the movement member.

Figure 18A:
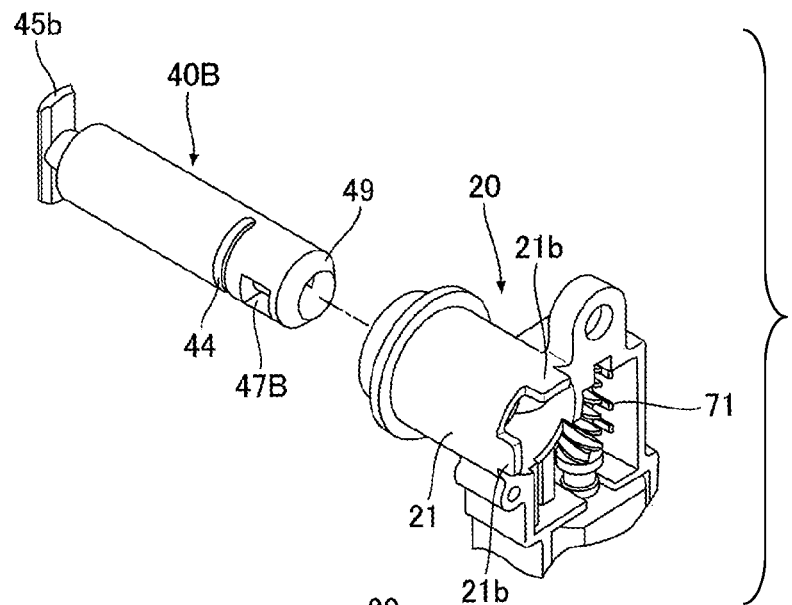
Figure 18B:
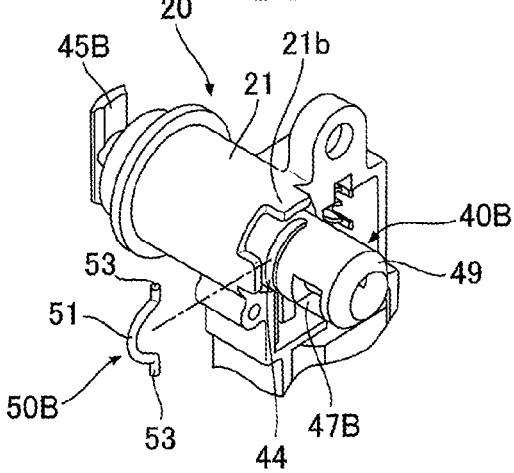

Also, as shown in FIG. 18B, in the state where the movement member 40B is arranged in the cylindrical part (here, the first cylinder part 21) of the first body part 20, the mounting groove 44 can be exposed from the inner periphery of the cylindrical part (first cylinder part 21) of the first body part 20.

Figure 19:
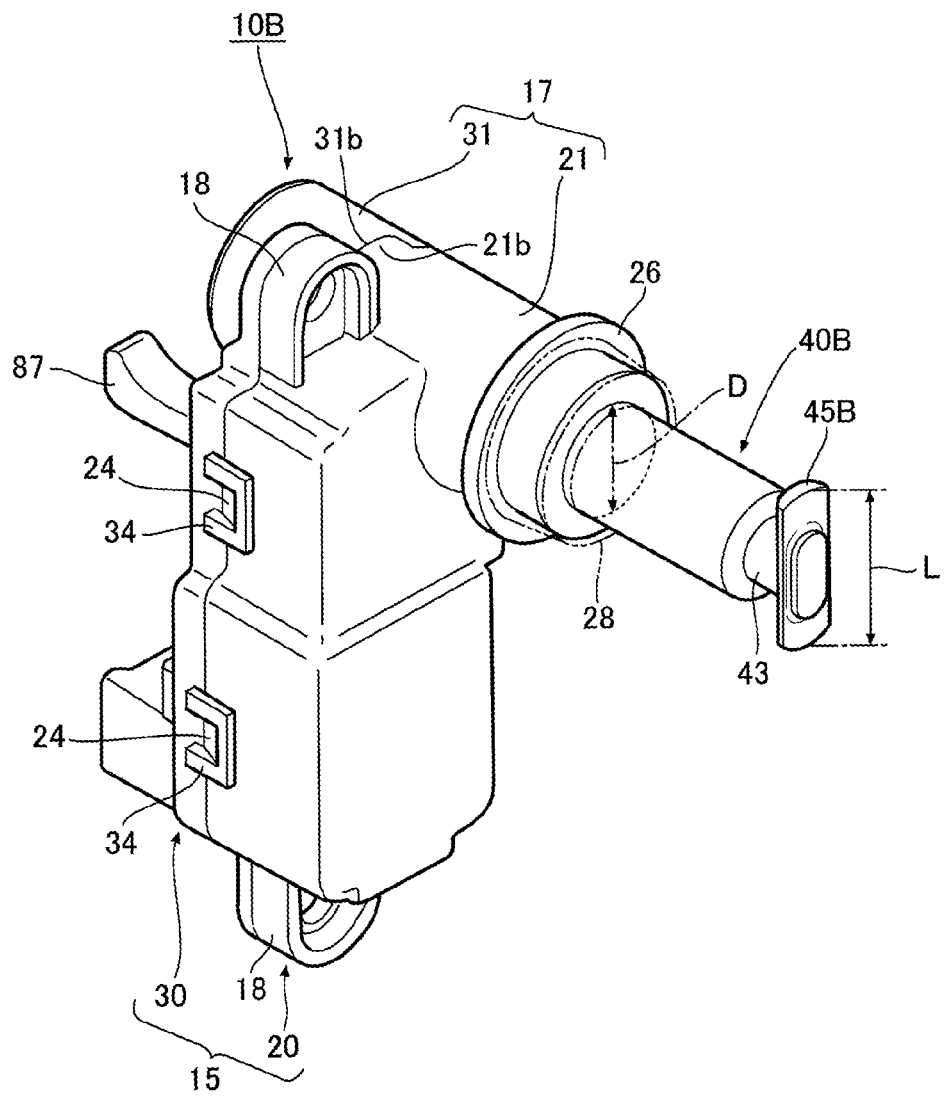
FIG. 19 is an enlarged perspective view of the rotary type extension/retraction device.

Also, as shown in FIG. 19, the band-shaped engaging piece 45B provided at the leading end-side of the movement member 40B has an axial length L set greater than an inner diameter D of the cylindrical part (first cylinder part 21) of the first body part 20.

Figure 18C:
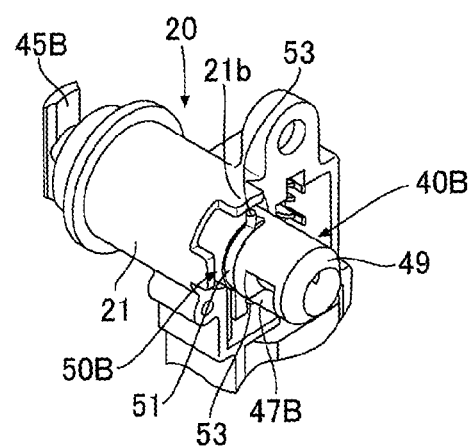

The extension/retraction device 10B having the above structure can be mounted as follows. First, the movement member 40B is inserted from one end-side opening (an opening opposite to the second body part 30) of the first cylinder part 21 of the first body part 20, as shown in FIG. 18A, and the base end-side of the movement member 40B is made to come out from the other end-side opening (an opening of the division surface-side) of the first cylinder part 21, as shown in FIG. 18B, so that the mounting groove 44 provided on the movement member 40B is exposed from the inner periphery of the first cylinder part 21. Then, the curved portion 51 of the protrusion 50B is inserted in the mounting groove 44, so that the protrusion 50B is mounted to the mounting groove 44 with the protruding portions 53, 53 of the protrusion 50B extending in the outer diameter direction of the movement member 40B from both circumferential ends of the mounting groove 44 and the protrusion 50B is thus formed on the movement member 40B, as shown in FIG. 18C.

That is, in the present invention, the description "the protrusion is formed on "the outer periphery of the movement member"" has a meaning including not only an aspect where the protrusion is integrally provided to the movement member (refer to the first embodiment) but also an aspect where the protrusion provided separately from the movement member is mounted to the movement member and is thus provided on the outer periphery of the movement member.

In the meantime, the second body part 30 is mounted to the first body part 20, so that the pair of protruding portions 53, 53 of the protrusion 50B is fitted in the cam groove 60 formed by the end faces of the first body part 20 and the second body part 30 facing each other and the outer periphery of the protrusion is surrounded by the cylinder part 21. Therefore, the protrusion 50B is not separated from the movement member 40B.

In the second embodiment, as described above, in the state where the movement member 40B is arranged in the first cylinder part 21 of the first body part 20, the mounting groove 44 can be exposed from the inner periphery of the first cylinder part 21 of the first body part 20. Therefore, it is possible to mount the protrusion 50B to the movement member 40B with the simple operation of arranging the movement member 40B in the first cylinder part 21 of the first body part 20 and inserting the curved portion 51 of the protrusion 50B in the mounting groove 44 exposed from the inner periphery of the first cylinder part 21, so that it is possible to improve the mounting operability of the protrusion 50B to the movement member 40B.

Also, as shown in FIG. 19, since the engaging piece 45B of the movement member 40B has the axial length L set greater than the inner diameter D of the first cylinder part 21 of the first body part 20, following operational effects are achieved. The effects are described in more detail with reference to FIG. 21.

Figure 21:
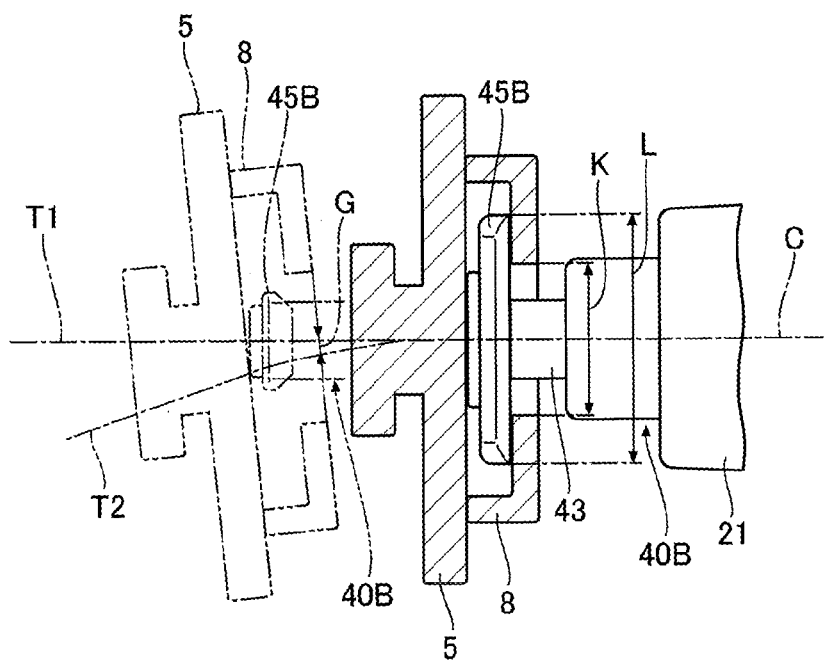
FIG. 21 illustrates moving loci of the movement member and the opening and closing member of the rotary type extension/retraction device.

The extension/retraction device 10B of the second embodiment is a lifter for lifting the opening and closing member 5, and a moving locus T1 of the movement member 40B forms a line shape along an axis center of the cylindrical part 17 of the body member 15. In the meantime, the extension/retraction device 10B of the second embodiment is used for the opening and closing member 5 configured to be opened and closed via the hinge part 3 (refer to FIG. 1), and a moving locus (a locus upon the opening and closing) T2 forms a curved shape, as shown in FIG. 21. For this reason, a deviation G occurs between the moving locus T1 of the movement member 40B and the moving locus T2 of the opening and closing member 5.

In the case where there is the deviation G, when the movement member 40B protrudes from one end in the protruding direction of the cylindrical part 17, the longitudinal direction of the engaging piece 45B is parallel with the groove direction of the engaging groove 8 and the engaging piece 45B can be thus disengaged from the engaging groove 8, the engaging piece 45B may be easily caught at the inner periphery of the engaging groove 8, in some cases. For this reason, it is necessary to increase an opening length K of the engaging groove 8. However, in this cases, when the opening and closing member 5 is press-fitted to pull the movement member 40B in the cylindrical part 17 and the protruding portion 53 of the protrusion 50B is thus fitted in the second fitting groove 63 of the cam groove 60 so as to lock the opening and closing member 5 in the closed state, the engaging piece 45B is difficult to engage with the inner periphery of the engaging groove 8. Therefore, it is necessary to increase a length of the engaging piece 45B in the longitudinal direction.

That is, since the deviation G occurs between the moving locus T1 of the movement member 40B and the moving locus T2 of the opening and closing member 5, it is necessary to increase the opening length K of the engaging groove 8, considering a relief margin of the engaging piece 45B from the opening of the engaging groove 8. Also, it is necessary to set the length L of the engaging piece 45B so that a sufficient lap margin can be taken with respect to the opening length K. In the second embodiment, since the length L of the engaging piece 45B is set greater than the inner diameter D of the first cylinder part 21 of the first body part 20, it is possible to securely engage the engaging piece 45B with the engaging groove 8 of the opening and closing member 5 and to securely perform the opening and closing lock of the opening and closing member 5 with respect to the fixed member 1.

In the meantime, like the extension/retraction device 10 of the first embodiment, the extension/retraction device 10B can be mounted to the outer surface of the fixed member 1 having the substantially cylindrical box shape as shown in FIG. 1. In FIG. 1, a mounting angle E1 of the extension/retraction device 10 to the outer surface of the fixed member 1 is substantially parallel with the outer surface of the fixed member 1. However, considering a mounting space of the fixed member 1 to the peripheral edge of the fuel filler tube opening of the vehicle body 1a, the extension/retraction device 10 and the extension/retraction device 10B may be mounted to the outer surface of the fixed member 1 with a mounting angle E2 inclined obliquely inward, as compared to the mounting angle E1. In this case, the deviation G between the moving locus T1 of the movement member 40B and the moving locus T2 of the opening and closing member 5 increases. However, also in this case, since it is possible to increase the length L of the engaging piece 45B, it is possible to securely engage the engaging piece 45B with the engaging groove 8 of the opening and closing member 5.

In the second embodiment, the protrusion 50B is provided separately from the movement member 40B. Therefore, when the protrusion 50B is formed of a material such as metal having high bending strength, for example, it is possible to make the outer diameter of the protrusion B (here, the outer diameter of the protruding portion 53) smaller than the outer diameter of the protrusion 50 of the first embodiment, so that following operational effects are achieved. The effects are described in more detail with reference to FIG. 22.

Figure 22:
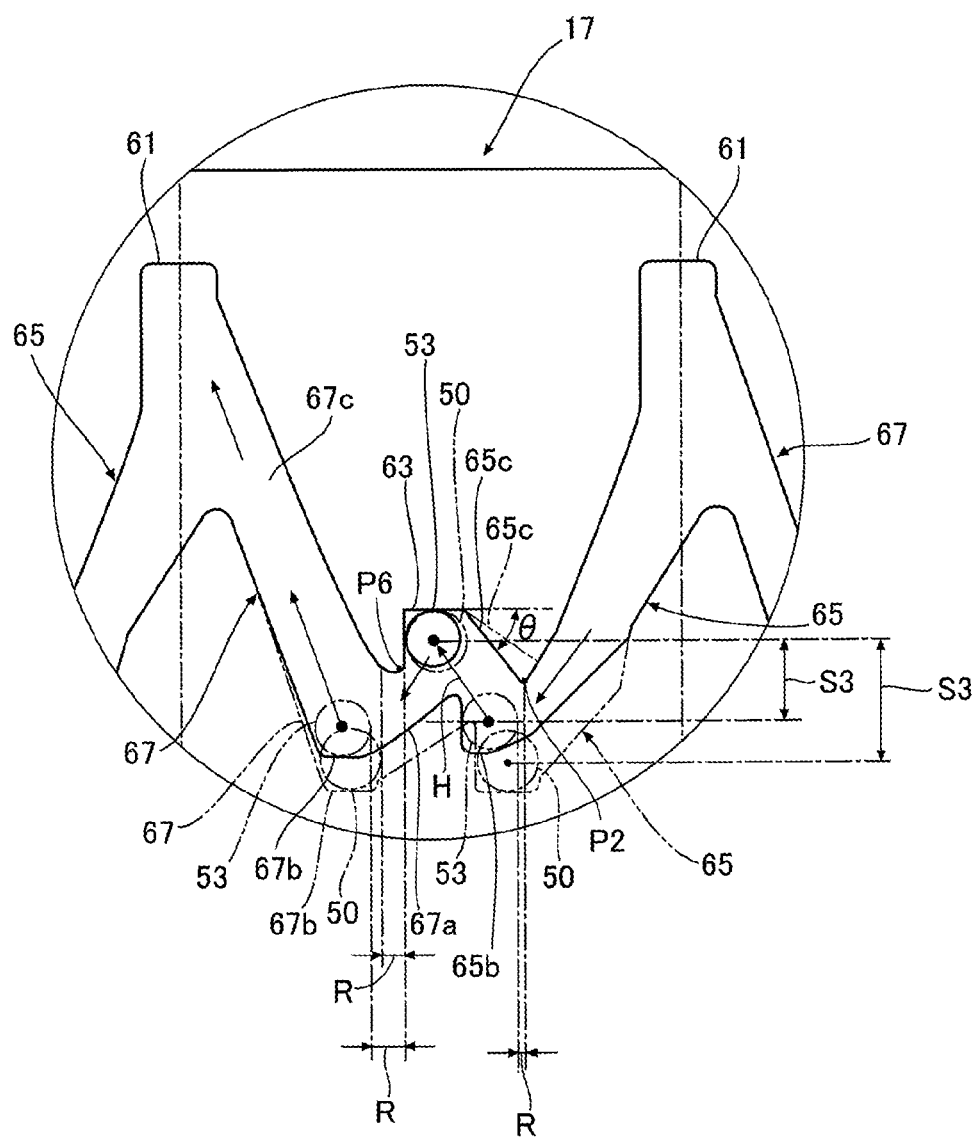
FIG. 22 is an enlarged view of main parts illustrating another example of the relation between the protrusion and the cam groove in the rotary type extension/retraction device.

FIG. 22 illustrates a case where the outer diameter of the protruding portion 53 of the protrusion 50B is formed smaller than the outer diameter of the protrusion 50 of the first embodiment shown in FIGS. 8A and 8B and regarding the strokes S3 of the protruding portion 53 and the protrusion 50 (hereinafter, simply referred to as "stroke S3") from the stopper portion 65b of the first guide groove 65 to the second fitting groove 63, the stroke S3 of the protruding portion 53 is made shorter than the stroke S3 of the protrusion 50.

In this case, the outer diameter of the protruding portion 53 of the protrusion 50B is reduced to shorten the stroke S3. Also, even when the stroke S3 is shortened, an inclination angle θ of the guide surface 65c of the first guide groove 65 relative to the circumferential direction of the cylindrical part 17 can be increased. Therefore, a pulling-in force H from the stopper portion 65b of the first guide groove 65 toward the second fitting groove 63 is made small in the direction along the axis center of the cylindrical part 17 and is made great in the direction along the circumferential direction of the cylindrical part 17, so that it is possible to easily move the protruding portion 53 in one direction of the inner periphery of the cylindrical part.

Also, the outer diameter of the protruding portion 53 of the protrusion 50B is reduced, so that it is possible to secure a lap amount R of the protrusion 50B relative to the cam groove 60 for restraining the movement of the protrusion 50B to one direction of the inner periphery of the cylindrical part 17, as shown in FIG. 22. Here, the lap amount R means a distance (refer to a right R in FIG. 22) from the position P2 to the protrusion 50B of which movement is restrained by the stopper portion 65b of the first guide groove 65 or a distance (refer to a left R in FIG. 22) from the position P6 to the protrusion 50B of which movement is restrained by the stopper portion 67b of the second guide groove 67. However, since it is possible to largely secure the lap amount R, as compared to a lap amount R of the protrusion 50 of the first embodiment, it is possible to suppress the protruding portion 53 of the protrusion 50B from moving in the other direction of the inner periphery of the cylindrical part 17 and to securely move the same in one direction of the inner periphery of the cylindrical part 17.

Like this, in the second embodiment, the protrusion 50B is provided separately from the movement member 40B, so that the outer diameter of the protruding portion 53 of the protrusion B can be set smaller than the outer diameter of the protrusion 50. Thereby, as shown in FIG. 22, it is possible to shorten the press-fitting stroke S3 of the protruding portion 53 of the protrusion 50B. Also, while it is possible to secure the lap amount R of the protrusion 50B relative to the cam groove 60 for restraining the movement of the protrusion 50B to one direction of the inner periphery of the cylindrical part 17, it is possible to increase the inclination angle θ of the guide surface 65c of the first guide groove 65 relative to the circumferential direction of the cylindrical part 17. Therefore, it is possible to securely move the protrusion 50B (here, the protruding portion 53) in one direction of the inner periphery of the cylindrical part 17 and to mount the extension/retraction device 10B even at a place at which it is difficult to secure the press-fitting stroke amount of the movement member 40B.

Also, in the second embodiment, the mounting groove 44 has the circular arc along the outer periphery of the movement member 40B, the protrusion 50B has the curved portion 51 to be inserted in the mounting groove 44 and the protruding portions 53 extending from the end portions of the curved portion 51 in the outer diameter direction of the movement member 40B, and the protruding portions 53 are configured to be fitted in the cam groove 60. Therefore, as shown in FIG. 20, when the spring member 55 is accommodated in the inner periphery of the movement member 40B, it is possible to prevent the protruding portions 53 of the protrusion 50B from interfering with the spring member 55, so that the extension and retraction operations of the spring member 55 are securely performed.

Also, in the second embodiment, the protruding portions 53 of the protrusion 50B are provided at both end portions of the curved portion 51. Therefore, when the movement member 40B is pressed, the two protruding portions 53, 53 are moved in the cam groove 60. Therefore, it is possible to axially move or rotate the movement member 40B relative to the cylindrical part 17 of the body member 15 in a balanced manner by the stable press-fitting force and to further reduce the outer diameter of the protruding portion 53 of the protrusion 50B, so that it is possible to further shorten the press-fitting stroke of the movement member 40B.

In the meantime, the present invention is not limited to the above embodiments and can be diversely modified within the scope of the gist of the present invention, and the modified embodiments are also included within the scope of the present invention.

DESCRIPTION OF REFERENCE NUMERALS

1: Fixed Member
5: Opening and Closing Member
8: Engaging Groove
10, 10A, 10B: Rotary Type Extension/Retraction Device (Extension/Retraction Device)
15: Body Member
17: Cylindrical Part
20: First Body Part
28: Seal Member
30: Second Body Part
40, 40B: Movement Member
41: Spring Accommodation Space
44: Mounting Groove
45, 45B: Engaging Piece
47, 47B: Lock Groove
50, 50A, 50B: Protrusion
51: Curved Portion
53: Protruding Portion
55: Spring Member
60, 60A: Cam Groove
61: First Fitting Groove
63: Second Fitting Groove
65: First Guide Groove
67: Second Guide Groove
70: Drive Device
80: Engagement Member

The invention claimed is:

1. A rotary type extension/retraction device comprising:
a body member having a cylindrical part of which an inner periphery has a circular shape;
a movement member having a circular outer periphery, arranged in the cylindrical part of the body member and held to be axially slidable and rotatable relative to the cylindrical part;
a spring member for urging the movement member in a direction protruding from one end of the cylindrical part;
a protrusion formed on the outer periphery of the movement member; and
a cam groove formed on the inner periphery of the cylindrical part and configured to fit therein the protrusion,
wherein the cam groove has a first fitting groove configured to fit therein the protrusion and to hold the movement member in a state protruding from the cylindrical part, a second fitting groove configured to fit therein the protrusion and to hold the movement member in a state pulled in the cylindrical part, a first guide groove configured to, when the movement member is pressed against an urging force of the spring member in a state where the protrusion is fitted in the first fitting groove, guide the protrusion from the first fitting groove to the second fitting groove, and inclined in one direction of the inner periphery of the cylindrical part, and a second guide groove configured to, when the movement member is pressed against the urging force of the spring member in a state where the protrusion is fitted in the second fitting groove, guide the protrusion from the second fitting groove to the first fitting groove, and inclined in one direction of the inner periphery of the cylindrical part,
wherein the first fitting groove, the first guide groove, the second fitting groove and the second guide groove are arranged circumferentially along the inner periphery of the cylindrical part in this order,
wherein the body member is configured by a first body part and a second body part divided in an axial direction of the cylindrical part, and
wherein in a state where the first body part and the second body part are mounted to each other, the cam groove is formed by end faces of the first body part and the second body part facing each other.

2. The rotary type extension/retraction device according to claim 1, wherein a base end-side of the movement member, which is opposite to a protruding direction from the body member, has a concave shape and a spring accommodation space in which the spring member is arranged is provided therein.

3. The rotary type extension/retraction device according to claim 1,
wherein the rotary type extension/retraction device is used to lock an opening and closing member configured to be openable and closable with respect to a fixed member, and is mounted to the fixed member,
wherein a leading end-side of the movement member in a protruding direction from the body member is provided with an engaging piece configured to change an angle thereof in association with movement of the protrusion along the cam groove and to be engaged and disengaged to and from an engaging groove provided in the opening and closing member, and
wherein the engaging piece is configured to be disengaged from the engaging groove in a state where the protrusion is fitted in the first fitting groove, and the engaging piece is configured to be engaged to the engaging groove in a state where the protrusion is fitted in the second fitting groove.

4. The rotary type extension/retraction device according to claim 3,
wherein the rotary type extension/retraction device comprises a drive device,
wherein a base end-side of the movement member, which is opposite to the protruding direction from the body member, is formed with a lock groove,
wherein an engagement member configured to be engaged to the lock groove by drive of the drive device in a state where the protrusion is fitted in the second fitting groove and the movement member is pulled-in from the cylindrical part is provided, and
wherein in a state where the engagement member is engaged to the lock groove, the movement member cannot be further press-fitted with the protrusion being fitted in the second fitting groove.

5. The rotary type extension/retraction device according to claim 3,
wherein the protrusion is provided separately from the movement member and the movement member has a mounting groove for mounting thereto the protrusion,
wherein the mounting groove can be exposed from an inner periphery of a cylindrical part of the first body part in a state where the movement member is arranged in the cylindrical part of the first body part, and
wherein the engaging piece of the movement member is formed larger than an inner diameter of the cylindrical part of the first body part.

6. The rotary type extension/retraction device according to claim 1, wherein the protrusion is provided separately from the movement member and the movement member has a mounting groove for mounting thereto the protrusion.

7. The rotary type extension/retraction device according to claim 6,
wherein the mounting groove has a circular arc shape along the outer periphery of the movement member, and
wherein the protrusion has a curved portion to be inserted in the mounting groove and a protruding portion extending from an end portion of the curved portion in an outer diameter direction of the movement member and the protruding portion is configured to be fitted in the cam groove.

8. The rotary type extension/retraction device according to claim 7, wherein the protruding portion of the protrusion is provided at both end portions of the curved portion.

* * * * *